(12) United States Patent
Graham

(10) Patent No.: US 11,500,280 B2
(45) Date of Patent: *Nov. 15, 2022

(54) MULTIPLE-POLARIZATION CLOAKING FOR PROJECTED AND WRITING SURFACE VIEW SCREENS

(71) Applicant: Steelcase Inc., Grand Rapids, MI (US)

(72) Inventor: Andrew Graham, Portland, ME (US)

(73) Assignee: STEELCASE INC., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,647

(22) Filed: Aug. 9, 2021

(65) Prior Publication Data

US 2021/0364905 A1 Nov. 25, 2021

Related U.S. Application Data

(63) Continuation of application No. 15/906,617, filed on Feb. 27, 2018, now Pat. No. 11,106,124.

(51) Int. Cl.
| | |
|---|---|
| *G06F 3/147* | (2006.01) |
| *G09G 3/00* | (2006.01) |
| *G09G 3/20* | (2006.01) |
| *G02B 27/01* | (2006.01) |
| *G02B 7/00* | (2021.01) |
| *G02B 5/30* | (2006.01) |
| *G02B 27/00* | (2006.01) |
| *G02B 27/28* | (2006.01) |
| *G02B 27/10* | (2006.01) |
| *G03B 21/604* | (2014.01) |
| *B43L 1/00* | (2006.01) |
| *F21V 9/14* | (2006.01) |

(Continued)

(52) U.S. Cl.
CPC ............ *G03B 21/604* (2013.01); *B43L 1/004* (2013.01); *F21V 9/14* (2013.01)

(58) Field of Classification Search
CPC .......... G03B 21/604; B43L 2/004; F21V 9/14
USPC .......................................................... 353/20
See application file for complete search history.

(56) References Cited

U.S. PATENT DOCUMENTS

| | | | |
|---|---|---|---|
| 1,610,423 | A | 12/1929 | Cawley |
| 2,018,963 | A | 10/1935 | Land |

(Continued)

FOREIGN PATENT DOCUMENTS

| | | |
|---|---|---|
| DE | 102011014615 A1 | 9/2012 |
| EP | 1725916 A2 | 11/2006 |

(Continued)

*Primary Examiner* — Jerry L Brooks
(74) *Attorney, Agent, or Firm* — Crowell & Moring LLP

(57) ABSTRACT

A system includes a view screen with polarized output. The view screen may include a projected view screen or writing-surface view screen. A window capable of blocking the polarized output at least in part cloaks the view screen to frustrate viewing of the view screen through the window. In some cases, the window includes an array of panels capable of blocking multiple polarizations. The array may disrupt multiple different polarized view screen outputs while maintaining transparency to unpolarized light. In some cases, the window capable of blocking polarized output may be paired with view screen cover that converts view screen output in an unblocked polarization to one of the one or more polarizations blocked by the window.

20 Claims, 21 Drawing Sheets

(51) Int. Cl.
*F21V 8/00* (2006.01)
*G06F 3/01* (2006.01)
*H04N 9/31* (2006.01)
*G02C 5/16* (2006.01)
*G02C 11/00* (2006.01)
*G06F 1/16* (2006.01)
*G06F 1/20* (2006.01)
*H05K 7/20* (2006.01)
*G02B 5/18* (2006.01)
*G02B 6/34* (2006.01)

(56) References Cited

U.S. PATENT DOCUMENTS

| | | |
|---|---|---|
| 2,031,045 A | 2/1936 | Land |
| 2,099,694 A | 11/1937 | Land |
| 2,102,632 A | 12/1937 | Land |
| 2,222,414 A | 11/1940 | Hans |
| 2,230,262 A | 2/1941 | Leon |
| 2,285,792 A | 6/1942 | Bailey |
| 2,286,570 A | 6/1942 | Leon |
| 2,301,126 A | 11/1942 | Kriebel |
| 2,617,329 A | 11/1952 | Dreyer |
| 2,832,821 A | 4/1958 | Du Mont |
| 3,454,715 A | 7/1969 | Larach et al. |
| 3,840,731 A | 10/1974 | Saufferer |
| 4,486,694 A | 12/1984 | Ohba et al. |
| 4,749,261 A | 6/1988 | McLaughlin et al. |
| 4,847,488 A | 7/1989 | Muller et al. |
| 4,875,172 A | 10/1989 | Kanayama |
| 5,033,829 A | 7/1991 | Faroughy |
| 5,073,749 A | 12/1991 | Kanayama |
| 5,158,348 A | 10/1992 | Sakamoto |
| 5,165,064 A | 11/1992 | Mattaboni |
| 5,251,065 A | 10/1993 | Uetsuki |
| 5,287,130 A | 2/1994 | Umeda |
| 5,378,696 A | 1/1995 | Haikawa |
| 5,400,069 A | 3/1995 | Braun et al. |
| 5,444,570 A | 8/1995 | Uetsuki et al. |
| 5,463,360 A | 10/1995 | Buoli et al. |
| 5,488,496 A | 1/1996 | Pine |
| 5,503,513 A | 4/1996 | Detriche |
| 5,543,917 A | 8/1996 | Bushman |
| 5,619,219 A | 4/1997 | Coteus |
| 5,652,489 A | 7/1997 | Kawakami |
| 5,758,298 A | 5/1998 | Guldner |
| 5,793,470 A | 8/1998 | Haseltine |
| 5,999,316 A | 12/1999 | Allen et al. |
| 6,028,303 A | 2/2000 | Suzuki |
| 6,038,493 A | 3/2000 | Tow |
| 6,088,541 A | 7/2000 | Meyer |
| 6,148,100 A | 11/2000 | Anderson et al. |
| 6,232,735 B1 | 5/2001 | Baba et al. |
| 6,239,853 B1 | 5/2001 | Winker et al. |
| 6,262,843 B1 | 7/2001 | Marx |
| 6,292,713 B1 | 9/2001 | Jouppi et al. |
| 6,430,471 B1 | 8/2002 | Kintou et al. |
| 6,438,456 B1 | 8/2002 | Feddema et al. |
| 6,505,096 B2 | 1/2003 | Takenaka et al. |
| 6,507,773 B2 | 1/2003 | Parker et al. |
| 6,535,793 B2 | 3/2003 | Allard |
| 6,539,284 B2 | 3/2003 | Nourbakhsh et al. |
| 6,542,788 B2 | 4/2003 | Hosonuma et al. |
| 6,552,850 B1 | 4/2003 | Dudasik |
| 6,564,888 B1 | 5/2003 | Gomi et al. |
| 6,604,021 B2 | 8/2003 | Imai et al. |
| 6,646,801 B1 | 11/2003 | Sley |
| 6,690,134 B1 | 2/2004 | Jones et al. |
| 6,710,797 B1 | 3/2004 | McNelley |
| 6,718,232 B2 | 4/2004 | Fujita et al. |
| 6,760,646 B2 | 7/2004 | Osawa |
| 6,760,647 B2 | 7/2004 | Nourbakhsh et al. |
| 6,781,338 B2 | 8/2004 | Jones et al. |
| 6,845,297 B2 | 1/2005 | Allard |
| 6,879,879 B2 | 4/2005 | Jouppi et al. |
| 6,909,544 B2 | 6/2005 | Kolosowsky |
| 6,914,622 B1 | 7/2005 | Smith et al. |
| 6,920,376 B2 | 7/2005 | Jouppi et al. |
| 6,925,357 B2 | 8/2005 | Wang et al. |
| 6,965,209 B2 | 11/2005 | Jones et al. |
| 6,974,356 B2 | 12/2005 | Hobson et al. |
| 7,092,792 B2 | 8/2006 | Hayashi et al. |
| 7,123,285 B2 | 10/2006 | Smith et al. |
| 7,136,090 B1 | 11/2006 | McDuffie |
| 7,142,945 B2 | 11/2006 | Wang et al. |
| 7,158,861 B2 | 1/2007 | Wang et al. |
| 7,190,392 B1 | 3/2007 | Maguire |
| 7,196,487 B2 | 3/2007 | Jones et al. |
| 7,198,360 B2 | 4/2007 | Watanabe et al. |
| 7,200,427 B2 | 4/2007 | Morita et al. |
| 7,209,160 B2 | 4/2007 | McNelly et al. |
| 7,222,000 B2 | 5/2007 | Wang et al. |
| 7,228,203 B2 | 6/2007 | Koselka et al. |
| 7,296,835 B2 | 11/2007 | Blackwell et al. |
| 7,324,872 B2 | 1/2008 | Nagasaka |
| 7,388,343 B2 | 6/2008 | Jones et al. |
| 7,388,879 B2 | 6/2008 | Sabe et al. |
| 7,467,026 B2 | 12/2008 | Sakagami et al. |
| 7,561,312 B1 | 7/2009 | Proudfoot et al. |
| 7,570,005 B2 | 8/2009 | Hashimoto et al. |
| 7,587,747 B2 | 9/2009 | Maguire |
| 7,593,030 B2 | 9/2009 | Wang et al. |
| 7,593,546 B2 | 9/2009 | Jouppi |
| 7,613,544 B2 | 11/2009 | Park et al. |
| 7,613,999 B2 | 11/2009 | Weber et al. |
| 7,643,051 B2 | 1/2010 | Sandberg et al. |
| 7,649,331 B2 | 1/2010 | Hosoda et al. |
| 7,677,345 B2 | 3/2010 | Hosoda |
| 7,706,917 B1 | 4/2010 | Chiappetta et al. |
| 7,720,554 B2 | 5/2010 | DeBernardo et al. |
| 7,720,572 B2 | 5/2010 | Ziegler et al. |
| 7,729,607 B2 | 6/2010 | Karim |
| 7,756,614 B2 | 7/2010 | Jouppi |
| 7,761,185 B2 | 7/2010 | Wang et al. |
| 7,769,491 B2 | 8/2010 | Fukuchi et al. |
| 7,769,492 B2 | 8/2010 | Wang et al. |
| 7,773,299 B2 | 8/2010 | Martin |
| 7,872,666 B2 | 1/2011 | Van Schaik et al. |
| 7,873,448 B2 | 1/2011 | Takeda et al. |
| 7,877,165 B2 | 1/2011 | Sugiyama et al. |
| 7,889,283 B2 | 2/2011 | Yoshimi et al. |
| 7,916,165 B2 | 3/2011 | Ferren et al. |
| 7,949,616 B2 | 5/2011 | Levy et al. |
| 7,957,837 B2 | 6/2011 | Ziegler |
| 7,965,443 B2 | 6/2011 | Martin |
| 8,010,231 B2 | 8/2011 | Sumida et al. |
| 8,014,901 B2 | 9/2011 | Matsushima et al. |
| 8,040,104 B2 | 10/2011 | Teng et al. |
| 8,041,456 B1 | 10/2011 | Blackwell et al. |
| 8,072,481 B1 | 12/2011 | McNelley et al. |
| 8,073,564 B2 | 12/2011 | Bruemmer et al. |
| 8,077,963 B2 | 12/2011 | Wang et al. |
| 8,083,013 B2 | 12/2011 | Bewley et al. |
| 8,090,193 B2 | 1/2012 | Higaki et al. |
| 8,095,238 B2 | 1/2012 | Jones et al. |
| 8,096,660 B2 | 1/2012 | Vertegaal et al. |
| 8,103,383 B2 | 1/2012 | Nakamura |
| 8,106,616 B1 | 1/2012 | Theobald |
| 8,116,910 B2 | 2/2012 | Walters et al. |
| 8,121,728 B2 | 2/2012 | Chiang |
| 8,144,181 B2 | 3/2012 | Gladstone |
| 8,160,746 B2 | 4/2012 | Blackwell et al. |
| 8,170,241 B2 | 5/2012 | Roe et al. |
| 8,174,739 B2 | 5/2012 | Proudfoot et al. |
| 8,179,418 B2 | 5/2012 | Wright et al. |
| 8,180,486 B2 | 5/2012 | Saito et al. |
| 8,190,295 B1 | 5/2012 | Garretson et al. |
| 8,195,333 B2 | 6/2012 | Ziegler et al. |
| 8,199,109 B2 | 6/2012 | Robbins et al. |
| 8,199,185 B2 | 6/2012 | McNelley et al. |
| 8,209,051 B2 | 6/2012 | Wang et al. |
| 8,209,055 B2 | 6/2012 | Shu |
| 8,265,793 B2 | 9/2012 | Cross et al. |
| 8,285,482 B2 | 10/2012 | Kong et al. |

(56) References Cited

U.S. PATENT DOCUMENTS

| | | |
|---|---|---|
| 8,339,456 B2 | 12/2012 | Eledath et al. |
| 8,340,819 B2 | 12/2012 | Mangaser et al. |
| 8,359,122 B2 | 1/2013 | Koselka |
| 8,451,537 B2 | 5/2013 | Yoshimi et al. |
| 8,463,435 B2 | 6/2013 | Herzog et al. |
| 8,565,922 B2 | 10/2013 | Kidd |
| 8,634,960 B2 | 1/2014 | Sandin et al. |
| 8,700,197 B2 | 4/2014 | Plociennik et al. |
| 8,708,820 B2 | 4/2014 | Mattice et al. |
| 8,721,543 B2 | 5/2014 | Saffarian |
| 8,905,610 B2 | 12/2014 | Coleman et al. |
| 8,909,370 B2 | 12/2014 | Stiehl et al. |
| 8,918,209 B2 | 12/2014 | Rosenstein et al. |
| 8,930,019 B2 | 1/2015 | Allen et al. |
| 8,935,005 B2 | 1/2015 | Rosenstein et al. |
| 8,935,006 B2 | 1/2015 | Vu et al. |
| 8,941,678 B2 | 1/2015 | Kurtz et al. |
| 9,014,848 B2 | 4/2015 | Farlow et al. |
| 9,028,123 B2 | 5/2015 | Nichol et al. |
| 9,044,862 B2 | 6/2015 | Mead et al. |
| 9,056,584 B2 | 6/2015 | Fish, Jr. et al. |
| 9,134,178 B2 | 9/2015 | Kurtz et al. |
| 9,140,607 B2 | 9/2015 | Maier et al. |
| 9,164,512 B2 | 10/2015 | Oobayashi et al. |
| 9,375,843 B2 | 6/2016 | Wang et al. |
| 9,400,503 B2 | 7/2016 | Kearns et al. |
| 9,464,932 B2 | 10/2016 | Li et al. |
| 9,547,112 B2 | 1/2017 | Mead et al. |
| 9,575,336 B1 | 2/2017 | Cao et al. |
| 9,645,304 B2 | 5/2017 | Nichol et al. |
| 11,106,124 B2* | 8/2021 | Graham .............. G03B 21/604 |
| 2002/0128746 A1 | 9/2002 | Boies et al. |
| 2003/0089956 A1 | 5/2003 | Allen et al. |
| 2003/0103261 A1 | 6/2003 | Hay |
| 2005/0091684 A1 | 4/2005 | Kawabata et al. |
| 2006/0052676 A1 | 3/2006 | Wang et al. |
| 2006/0056026 A1 | 3/2006 | Kolosowsky |
| 2006/0193046 A1 | 8/2006 | Yellin |
| 2006/0196127 A1 | 9/2006 | Tillman |
| 2006/0259193 A1 | 11/2006 | Wang et al. |
| 2008/0134801 A1 | 6/2008 | Tseng et al. |
| 2008/0310021 A1 | 12/2008 | Tillman |
| 2009/0030552 A1 | 1/2009 | Nakadai et al. |
| 2009/0109648 A1 | 4/2009 | Hay |
| 2010/0046071 A1 | 2/2010 | Nishimura et al. |
| 2010/0060817 A1 | 3/2010 | Park et al. |
| 2010/0217435 A1 | 8/2010 | Rodemann |
| 2011/0071702 A1 | 3/2011 | Wang et al. |
| 2011/0074915 A1 | 3/2011 | Ferren et al. |
| 2011/0077802 A1 | 3/2011 | Halloran et al. |
| 2011/0148938 A1 | 6/2011 | Yang |
| 2011/0170189 A1 | 7/2011 | Jackson, II |
| 2011/0190930 A1 | 8/2011 | Hanrahan et al. |
| 2011/0288417 A1 | 11/2011 | Pinter et al. |
| 2011/0288682 A1 | 11/2011 | Pinter et al. |
| 2011/0298885 A1 | 12/2011 | Root |
| 2012/0038738 A1 | 2/2012 | Matthews |
| 2012/0061155 A1 | 3/2012 | Berger et al. |
| 2012/0156655 A1 | 6/2012 | Goldberg |
| 2012/0281281 A1 | 11/2012 | Gutierrez |
| 2015/0378168 A1 | 12/2015 | Stacey et al. |
| 2016/0083997 A1* | 3/2016 | Seamon .................. E06B 9/24 |
| | | 52/204.5 |
| 2016/0364957 A1 | 12/2016 | Yuan et al. |
| 2017/0261830 A1 | 9/2017 | Luten |
| 2017/0310956 A1 | 10/2017 | Perdices-Gonzalez et al. |
| 2018/0307100 A1* | 10/2018 | Xu .................... G02F 1/133615 |

FOREIGN PATENT DOCUMENTS

| | | | |
|---|---|---|---|
| EP | 2390717 A1 | 11/2011 | |
| EP | 1414362 B1 | 1/2012 | |
| EP | 1855607 A4 | 11/2013 | |
| GB | 2428100 A | 1/2007 | |
| JP | S5929330 A | 2/1984 | |
| JP | S6364483 A | 5/1988 | |
| JP | 01191824 A | 8/1989 | |
| JP | 02116826 A | 5/1990 | |
| JP | 04358123 A | 12/1992 | |
| JP | 05010079 A | 1/1993 | |
| JP | H05134610 A | 5/1993 | |
| JP | 05173127 A | 7/1993 | |
| JP | 6138429 A | 5/1994 | |
| JP | 08313895 A | 11/1996 | |
| JP | 09081317 A | 3/1997 | |
| JP | 9106008 A | 4/1997 | |
| JP | 10049063 A | 2/1998 | |
| JP | 10051764 A | 2/1998 | |
| JP | 2001222004 A | 8/2001 | |
| JP | 2007308970 A | 11/2007 | |
| JP | 5225806 A | 7/2013 | |
| WO | WO 1997/027422 A1 | 7/1997 | |
| WO | WO 2001/038926 A1 | 5/2001 | |
| WO | WO-2004021379 A2 * | 3/2004 | ............ B32B 15/04 |
| WO | WO 2005/093512 A1 | 10/2005 | |
| WO | WO 2006/001497 A2 | 1/2006 | |
| WO | WO 2010/022230 A3 | 4/2010 | |
| WO | WO 2010/064234 A1 | 6/2010 | |
| WO | WO 2011/042135 A1 | 4/2011 | |

* cited by examiner

US 11,500,280 B2

MULTIPLE-POLARIZATION CLOAKING FOR PROJECTED AND WRITING SURFACE VIEW SCREENS

PRIORITY

This application is a continuation of and claims priority to U.S. patent application Ser. No. 15/906,617, filed 27 Feb. 2018, and titled Multiple-Polarization Cloaking for Projected and Writing-Surface View Screens, which is incorporated by reference in its entirety.

CROSS-REFERENCE TO RELATED APPLICATIONS

This application is related to U.S. Provisional Patent Application Ser. No. 62/515,508, filed 5 Jun. 2017, and titled Multiple-Polarization Cloaking, which is incorporated by reference in its entirety.

TECHNICAL FIELD

This disclosure relates to visual information obfuscation for polarized image sources.

BACKGROUND

Rapid advances in communications technologies and changing workspace organization have provided workforces with flexibility in selection and use of workplace environment. As just one example, in recent years, open plan workplaces have increased in utilization and popularity. Improvements in workspace implementation and functionality will further enhance utilization and flexibility of workplace environments.

DETAILED DESCRIPTION

Figure 1:
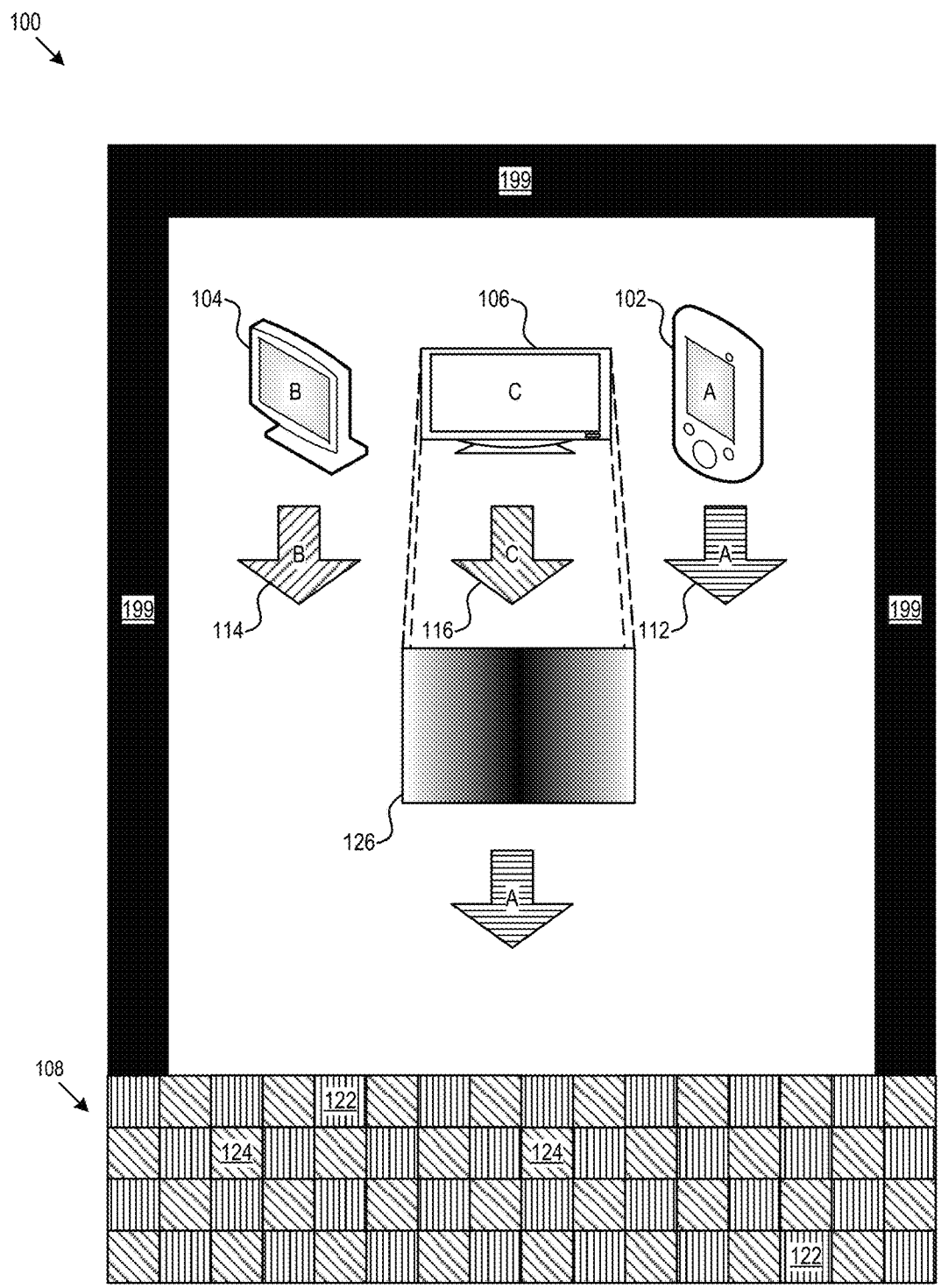
FIG. 1 shows an example multiple-polarization cloaking environment.

In various environments operators, such as, workers in a workspace presenting information on a view screen (for example, a television, computer screen, monitor, mobile device screen, teleconferencing screen, projector image, any polarized image source, or other view screen), people communicating in a teleconference, collaborators working in a group, or other individuals, may display sensitive information (e.g., private, non-public, confidential or otherwise sensitive material) on a view screen. Increasingly, sightlines in office environments are unobstructed both due to increasing popularity of open plan workplaces and improved construction techniques and architecture that reduce the underlying support structure footprint of a building which may inhibit sightlines. Accordingly, sensitive information displayed on view screens intended for an intimate audience within a room or other designated area, but may be intelligible (e.g., visible, readable, unobstructed, or otherwise observable) outside of the intended audience area. For example, unobstructed sightlines may allow viewing into the designated area despite an intention to limit viewing from outside the designated area.

Accordingly, techniques and architectures for cloaking sensitive information displays without necessarily inhibiting, or at least without completely obstructing sightlines, will allow for preservation of open plan layouts while maintaining privacy for sensitive information.

When light passes through a polarizer (or polarization filter), the polarizer will pass light of a particular polarization, while blocking light in other polarizations. Light polarized orthogonally to the passed polarization may exhibit the greatest attenuation (e.g., blocking). Accordingly, a polarizer may be described as passing a first polarization, as filtering a second polarization, or both.

Polarization may include the spatial orientation of the oscillation of the electronic field of travelling electromagnetic wave (e.g., light, or lightwaves). When the oscillation of the field is along a line in the plane transverse to propagation the light may be linearly polarized. The orientation of the linear polarization may be described by an angle. For purposes of explanation, light polarized horizontally and linearly may be referred to as 0-degree polarization. Accordingly, light polarized vertically and linearly may be referred to as 90-degree polarization and is orthogonal to the 0-degree polarization. Other orientations may be referred to by their relative angle (e.g., 0 to 180 degrees). When the oscillation orientation rotates (e.g. does not remain along a single angle) as the electromagnetic wave travels, the polarization may have a circular polarization component. The polarization component may be either right circular or left circular depending on the direction of rotation of the electromagnetic wave. Left and right circular polarizations may be orthogonal to one another. Unpolarized light may include multiple different polarization components. Unpolarized light may be converted to polarized light by passing the unpolarized light through a polarizer.

View screens may include various polarized image sources such a liquid crystal displays (LCDs), light emitting diode (LED) backlit displays, anti-reflective surface displays, organic light emitting diode displays (OLEDs), or other polarized image sources. Natural lighting sources may include unpolarized light sources. Therefore, placing a polarizer oriented to filter out the polarized light from the view screen over a window (or other transparent panel) in a room may obscure, block, or otherwise render unintelligible light from the view screen while allowing light from unpolarized sources or other polarizations to pass through the window. In other words, the light from the view screen is blocked by the polarizer while other light passes through the window, at least partially.

In some cases, different view screens may have different polarization output types (e.g., 0-degree polarization, 90-degree polarization, 45-degree polarization, 135-degree polarization, circular polarization, or other polarization). For example, different view screens may have linear polarization outputs with different orientations. Accordingly, a particular polarizer in a particular orientation that blocks output from a first view screen may not necessarily block output from a second view screen with different polarization output from the first view screen. However, blocking all possible polarizations (e.g., blocking a first polarization and its orthogonal complement polarization) may render a transparent window opaque. Accordingly, generating a single uniform panel that passively (e.g., without active mechanical rotation) blocks all possible polarized view screen outputs may result in an opaque panel.

A panel or window capable of multiple-polarization cloaking may be achieved by constructing the panel as a non-uniform array of at least first and second panels, where the first panels block a first polarization and the second panels block a second polarization. However, unpolarized light will pass through both sets of panels with only partial attenuation. The first and second panels may be interspersed (e.g., interlaced, mixed, or distributed) in an arrangement that, while allowing some of the polarized image to pass, renders the resulting output unintelligible after passing through the array regardless of whether the image is in the first or the second polarization. Additional panel sets (e.g., third, fourth, . . . , nth panel sets) may be interspersed with the first and second panel sets to block additional polarizations.

The non-uniform array may be made by patterning waveplates (e.g., a wave retarder, a birefringent material, a thin film waveplate, or other waveplate) onto a polarizer substrate. The polarizer substrate may filter light in a 'filtered polarization'. The patterned waveplates may convert light in polarizations other than the filtered polarization to the filtered polarization, such that it is blocked by the polarizer substrate. Individual panel sets may correspond to individual waveplate orientations/thicknesses such that one different polarization is blocked per panel set.

Additionally or alternatively, a window may be constructed to block one or more pre-determined polarizations. Any view screens that produce images in unblocked polarizations that are not included within the one or more pre-determined polarizations may be obscured by converting the unblocked polarizations into the one or more pre-determined polarizations. For example, light from a 90 degree polarization output view screen may be converted into 0 degree polarization by passing the output through a waveplate (e.g., a half-waveplate with fast axis oriented at 45 degrees). Accordingly, a waveplate cover may be mounted over view screens, such that a 0-degree polarization filtering panel may be used to block both the 90-degree polarization output of the view screen (after rotation) and 0-degree polarization output from other view screens. Other combinations are possible, as discussed below.

Accordingly, multiple-polarization cloaking may be used to preserve information privacy over a wide array of view screens using a polarizer panel that filters one or a pre-determined set of polarization outputs. Thus, multiple-polarization cloaking provides an improvement over existing market solutions by allowing one panel array or a panel-converter system to deliver information privacy for information displayed on different view screens with different polarization outputs while allowing light from unpolarized sources to at least partially pass. Thereby, multiple-polarization cloaking delivers the information privacy without necessarily interrupting the sightlines of an open plan layout.

FIG. 1 shows an example multiple-polarization cloaking environment (MPCE) 100. In the MPCE 100, multiple view screens 102, 104, 106 generate different polarization outputs 112, 114, 116. The inclusion of multiple view screens in the MPCE is done by way of example to show how the MPCE 100 may handle view screens with different polarization outputs. In various implementations, a single view screen or multiple view screens with the same or different polarization outputs may be present. The first view screen (View screen A 102) may have A-type polarization output 112, the second view screen (View screen B 104) may have B-type polarization output 114, and the third view screen (View screen C 106) may have C-type polarization output 116. The MPCE may further include non-transmissive walls 199 and a window 108.

The window 108 may include an array with interspersed panels including A-type blocking panels 122 and B-type blocking panels 124. The A-type blocking panels 122 may render images from A-type polarization output unintelligible. The B-type blocking panels 124 may render images from B-type polarization output unintelligible.

A, B, and C type polarizations may be arbitrary polarizations of different types. For example, A, B, and C type polarizations may be selected from among common polarization types for view screens, including 0 degree polarization, 90 degree polarization, 45 degree polarization, 135 degree polarization and circular polarization.

A view screen cover 126 may be mounted over View screen C 106. The view screen cover may convert C-type polarization into A-type polarization. For example, the view screen cover may include a waveplate (e.g., a wave retarder, a birefringent material, a thin film waveplate, or other waveplate) oriented to convert C-type to A-type. Accordingly, the converted C-to-A polarization output may be rendered unintelligible by the A-type blocking panels 122 on the window 108.

Waveplates

Waveplates may be constructed with different orientations and levels of wave retardance. Light polarization may be characterized as having two oscillating spatial components. The relative phase of the two components may determine the polarization of a lightwave. Accordingly, phase delaying one two components with respect to the other may alter the polarization of the light. At one level of retardance, e.g., half-wave or λ/2, the relative phase of the components may be delayed by 180 degrees or a half-wavelength. Delaying with a half-waveplate may change the orientation of linearly polarized light. At another level of retardance, e.g., quarter-wave or λ/4, the relative phase of the components may be delayed by 90 degrees or a quarter-wavelength. Delaying with a quarter-waveplate may change linearly polarized light into circularly polarized light or vice versa. Other retardances may be used to create elliptically polarized light or correct for elliptical polarization.

In some implementations, waveplates may be constructed from a birefringent material, e.g., a material with two different indices of refraction depending on the direction of oscillation of the e-field. The two different indices may cause different phase velocities for the light along two different spatial axes perpendicular to the direction of travel of the lightwave, e.g., a "fast axis" with a relatively lesser refractive index and a "slow axis" with a relatively lesser refractive index.

In some cases, a half-waveplate may rotate linear polarization by twice the angle between the fast axis and the angle of polarization of the light. Accordingly, a half-wave plate at 45 degrees will cause light at 90 degrees to convert to 0 degree or vice versa. In another example, half-wave plate at 22.5 degrees will cause light at 45 degrees to convert to 0 degree. In yet another example, half-wave plate at 67.5 degrees will cause light at 0 degrees to convert to 135 degrees.

In some cases, a quarter-waveplate oriented at 45 degrees relative to the orientation of a linearly polarized lightwave may convert the lightwave to circular polarization. Circularly polarized light incident on a quarter waveplate produces linearly polarized light at 45 degrees relative to the quarter-waveplate's fast axis. Accordingly, circularly polarized light incident on a quarter-waveplate oriented with its fast axis at 45 degrees may produce 0 degree polarized light. However, any output linear polarization may be achieved by orienting the fast axis of the quarter-waveplate.

Window Array

Figure 2:
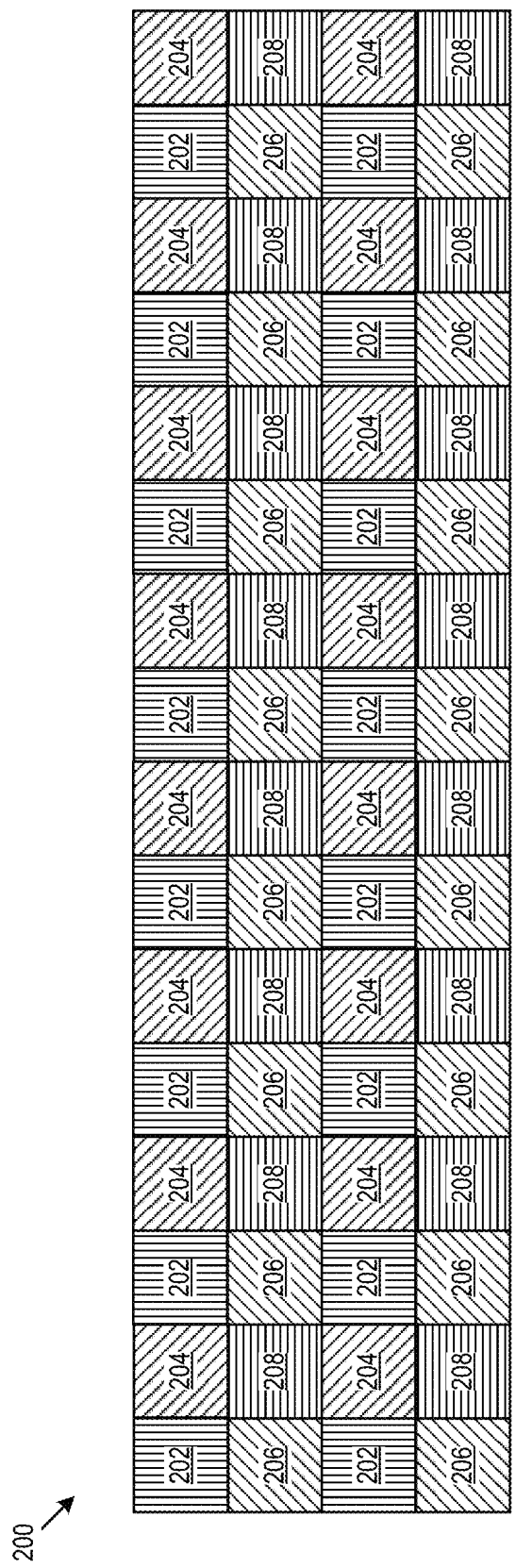
FIG. 2 shows an example window array.

FIG. 2 shows an example window array 200. The example window array includes panel sets of four types 202, 204, 206, 208. The four types are interspersed to makeup the window array and block four different polarizations. In the example window array 200, the panels are square.

In some cases, the array may be constructed by generating the window as a multiple paned (similar to a stained glass construction or tiled construction). Window-pane style construction may (in some cases) increase the attractiveness of the array. However, window-pane construction may be more complex and potential expensive that other constructions.

In some implementations, thin film waveplate panels, e.g., cholesteric liquid crystals (CLCs), liquid crystal polymers, VG Smartglass™ or other thin film waveplate, may be patterned on (e.g. through placement and curing or deposition) a window substrate (plastic, glass, tempered glass, or other substrate), roll printed and added as an adhesive layer to a polarizer substrate, or laminated between window layers. The thin film waveplate panels may be placed on single uniform polarizer pane (or laminate pane). Accordingly, the multiple panel array may be constructed from a single substrate pane.

In some implementations, the window array may be may be fabricated as a patterned waveplate film that may be laminated onto a linear polarizer. In some cases, the linear polarizer may also be a thin film. Accordingly, the patterned waveplate film and linear polarizer may be fashioned into a laminate film that may be applied to a glass, plastic, or other transmissive substrate.

Similarly, in some implementations, thin film polarizer materials (e.g., polyvinyl acetate, stretched polyvinyl alcohol impregnated with polyiodine, or other thin film polarizer materials) may be used on a transmissive substrate (e.g., optically clear) to construct the array. Polarizer panels blocking different polarizations may be interlaced to form the array.

Figure 3:
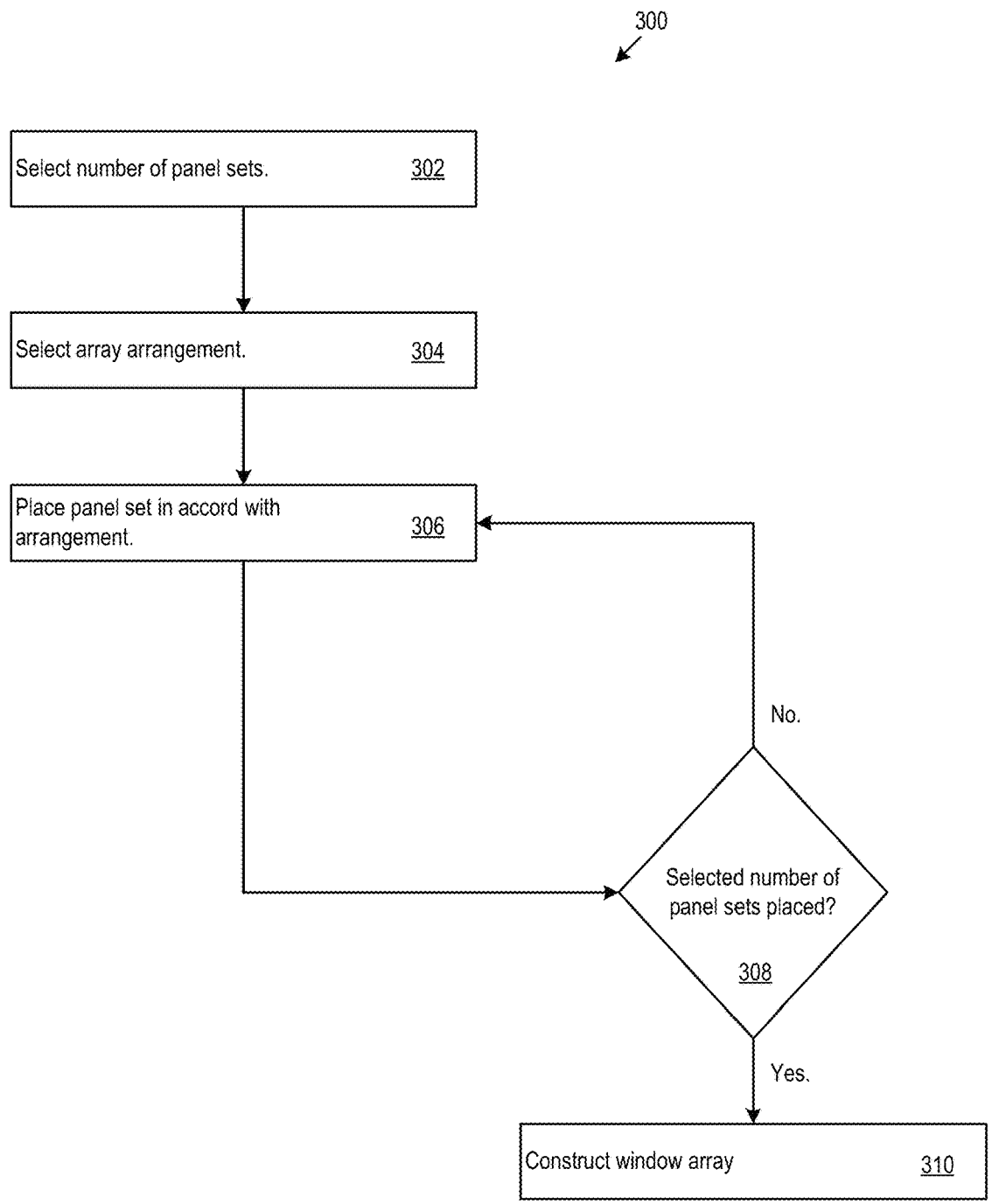
FIG. 3 shows an example technique for manufacturing a window array.

FIG. 3 shows an example technique 300 for manufacturing a window array. The number of panel sets is selected (302). For example, the window may be set up to block two or more different polarization types. Some common view screen polarizations may include 0 degree, 90 degree, 45 degree, 135 degree, and circular polarizations. In some cases, one or more of these common polarizations may be selected for the one or more panel sets. However, other polarizations may be selected. The array arrangement is selected (304). For example, the arrangement may include a checkered pattern, a crossing line pattern, a diagonal crossing line pattern, a fractal pattern, a multi-scale pattern, a repeated ring pattern, a constrained randomized pattern, a letter pattern, a repeated triangle pattern, an aperiodic tiling pattern, a security-envelope-like pattern or other arrangement of panels. The arrangement may be selected such that output from a view screen with any of the filter polarizations may be rendered unintelligible.

After the arrangement is selected, a panel set may be placed on the array in accord with the arrangement (306). Once the panel set is placed, it may be determined whether the selected number of panel sets have been placed (308). If the selected number of panel sets have not been placed, additional panel sets may be placed (306). If the selected number of panel sets have been placed, the window array may be constructed (310). For example, the multiple pane or thin film construction techniques discussed above may be used. In a thin film waveplate example, the panel sets may be placed and printed on a roll material and then laminated onto a polarizer substrate.

Figure 4:
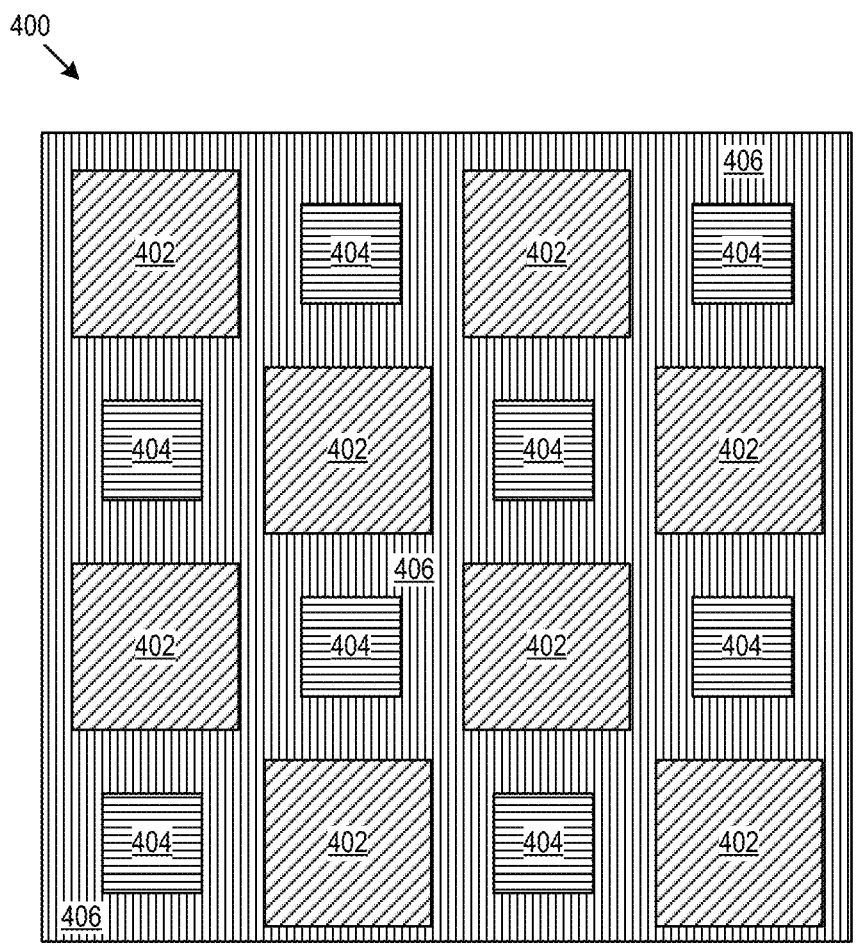
FIG. 4 shows an example multiple-size-parameter repeated square array.

FIG. 4 shows an example multiple-size-parameter repeated square array 400. In the multiple-size-parameter repeated square array 400, two example square sizes 402, 404 are repeated in a first-polarization-blocking background panel 406. Accordingly, the multiple-size-parameter repeated square array 400 may accommodate up to three or more panel sets (e.g. a panel set for the background 406 and two for the two different square sizes 402, 404). The multiple-size parameters include the different square sizes. In some implementations, the different size parameters may be selected independently from one another. For example, the size parameters may be selected based on disrupting viewing at two different size scales. Additionally or alternatively, the size parameters may selected to create an aesthetically pleasing design.

Figure 5:
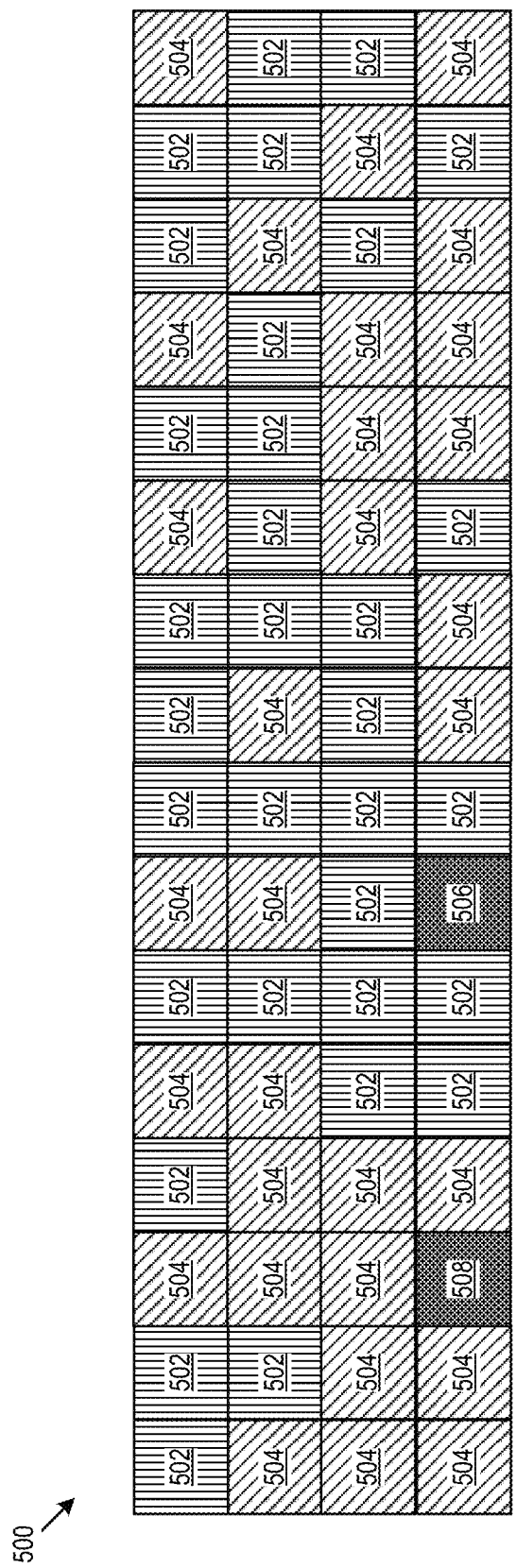
FIG. 5 shows an example constrained randomized pattern array.

FIG. 5 shows an example constrained randomized pattern array 500. The constrained randomized pattern may include multiple panel types (502, 504) placed in a randomized (e.g., random, pseudorandom or other non-deterministic pattern) arrangement in the array 500. However, in some cases, the randomized placement of the panels may be constrained. For example, the randomized placement may be constrained such that no more than a maximum area may occur in the array without at least one panel of every type. In the example constrained randomized pattern array 500, panel 506 is forced to be a specific panel type 504 because the surrounding area has too many panels of the other type 502. Similarly, another panel 508,602 is forced to be the other panel type 502. This may prevent arrays from having large sections that are unblocked for a given polarization.

Figure 6:
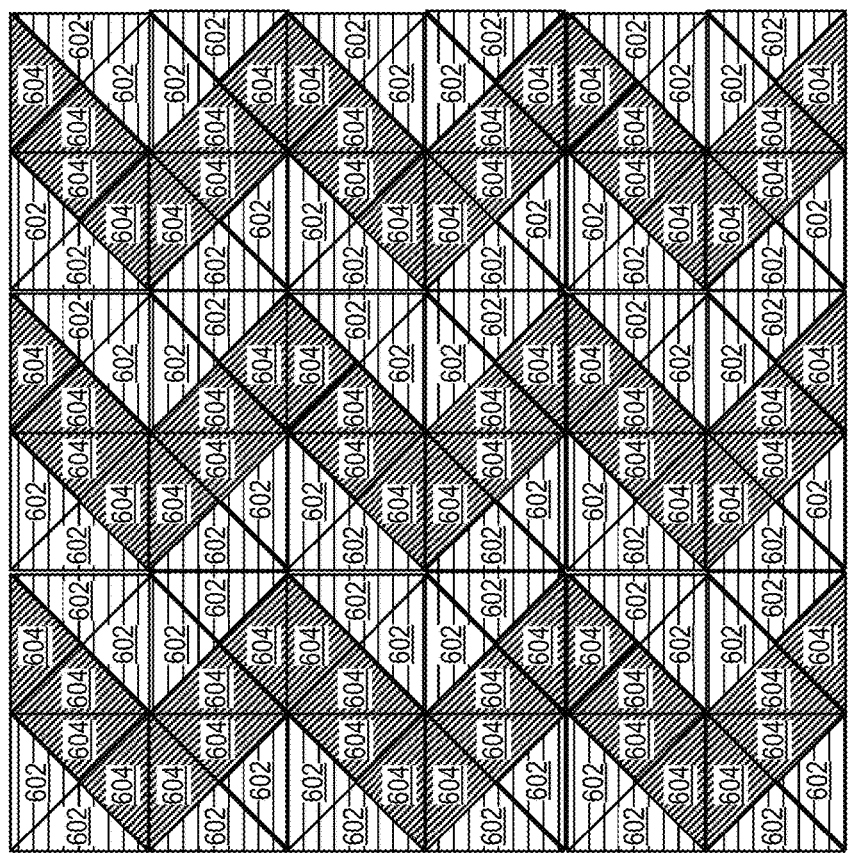
FIG. 6 shows an example repeated triangle pattern array.

FIG. 6 shows an example repeated triangle pattern array 600. In the example repeated triangle pattern array 600, isosceles triangle panels 602, 604 are interlaced. However, other triangle shapes may be used. For example, equilateral triangles may be organized into tessellating hexagons and a panel pattern may be formed from the interlaced triangles.

Figure 7:
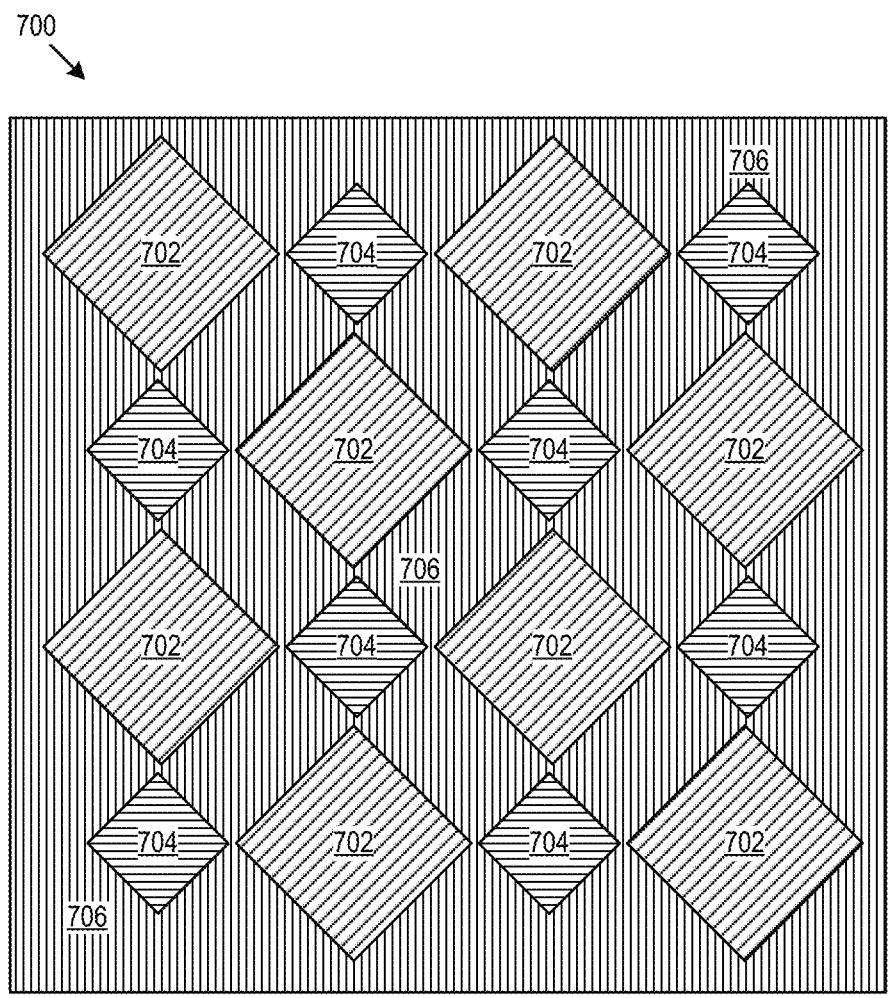
FIG. 7 shows an example multiple-size-parameter repeated diamond array.

FIG. 7 shows an example multiple-size-parameter repeated diamond array 700. In the multiple-size-parameter repeated diamond array 700, two example diamond sizes 702, 704 are repeated in a background panel 706. Accordingly, the multiple-size-parameter repeated square array 700 may accommodate up to three or more panel sets (e.g. a panel set for the background 706 and two for the two different square sizes 702, 704).

Figure 8:
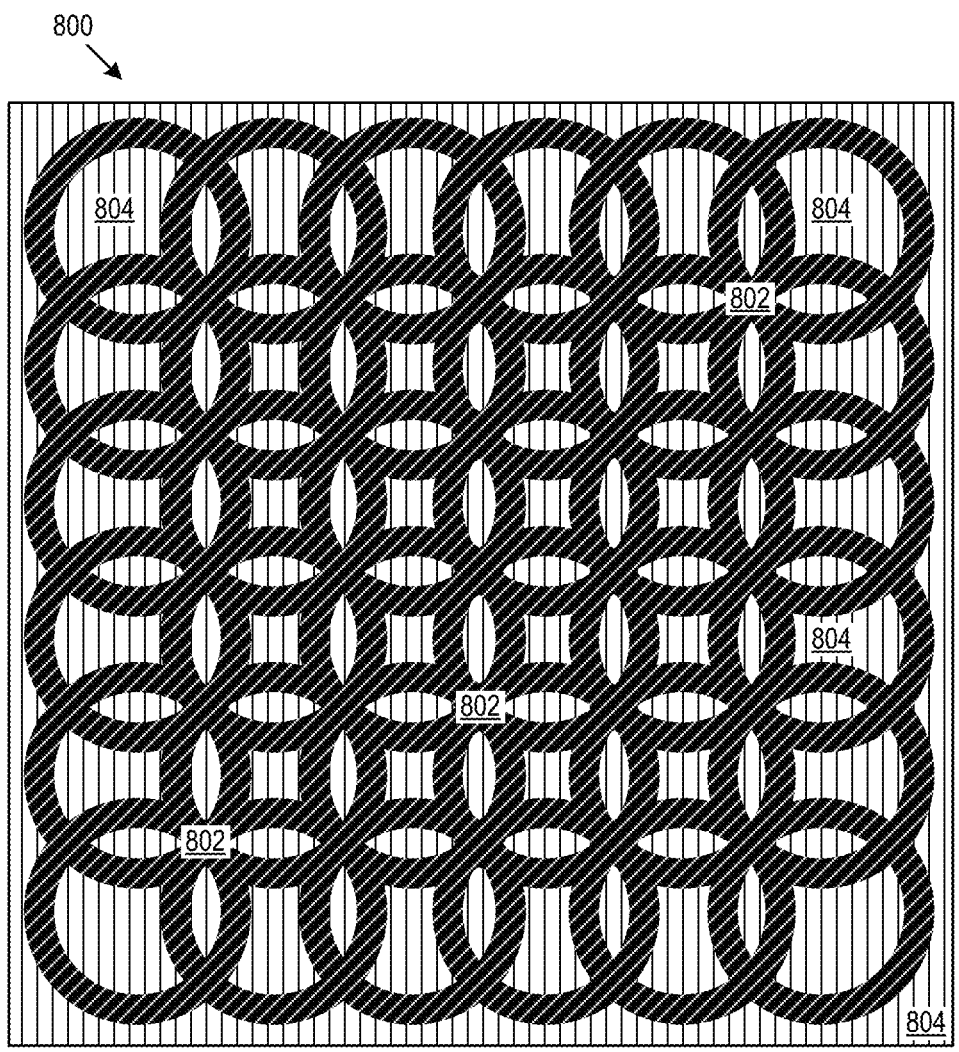
FIG. 8 shows an example ring array.

FIG. 8 shows an example ring array 800. Repeating rings 802 cross within the array over a background 804. The rings 802 divide the background 804 into multiple regions. Accordingly, both the rings 802 and background 804 may accommodate one or more panel sets. Circular rings are shown in the example ring array 800, but other off-circular (e.g., oval, elliptical) may be used.

Figure 9:
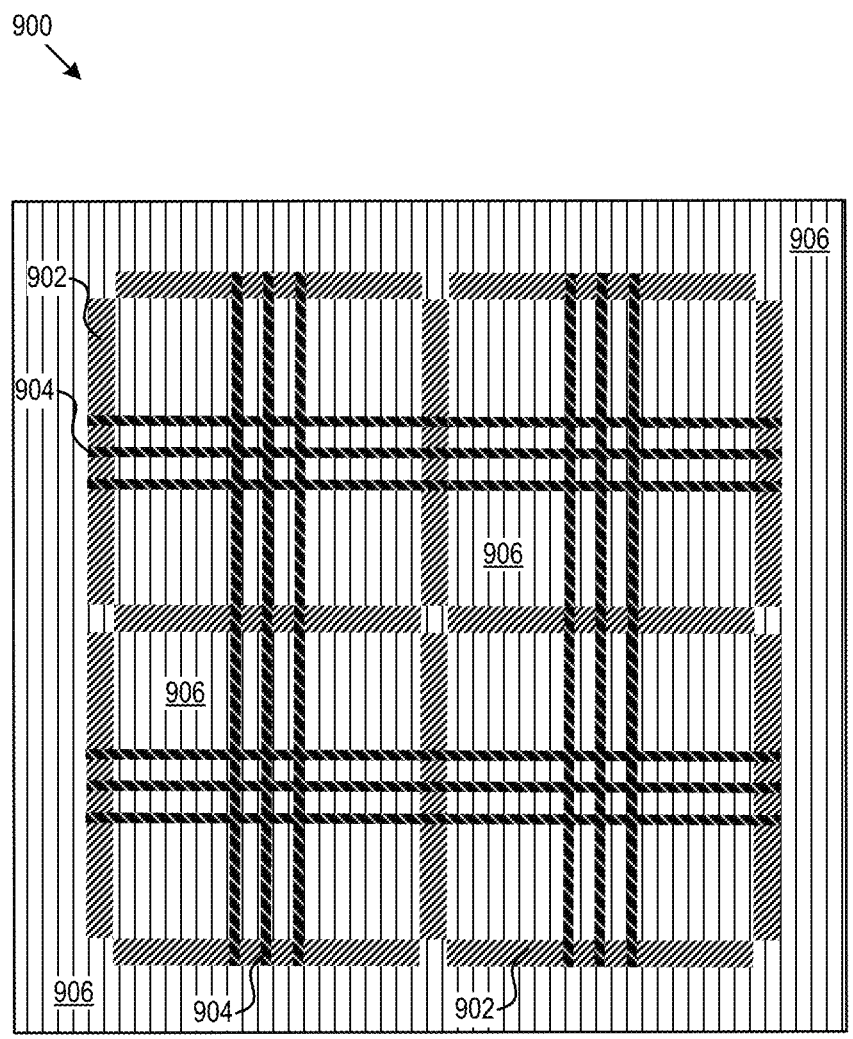
FIG. 9 shows an example crossing line array.

FIG. 9 shows an example crossing line array 900. The crossing lines 902, 904 may have multiple thicknesses, and may divide the background 906 into multiple regions. Accordingly, both the crossing lines 902, 904 and background 906 may accommodate one or more panel sets.

Figure 10:
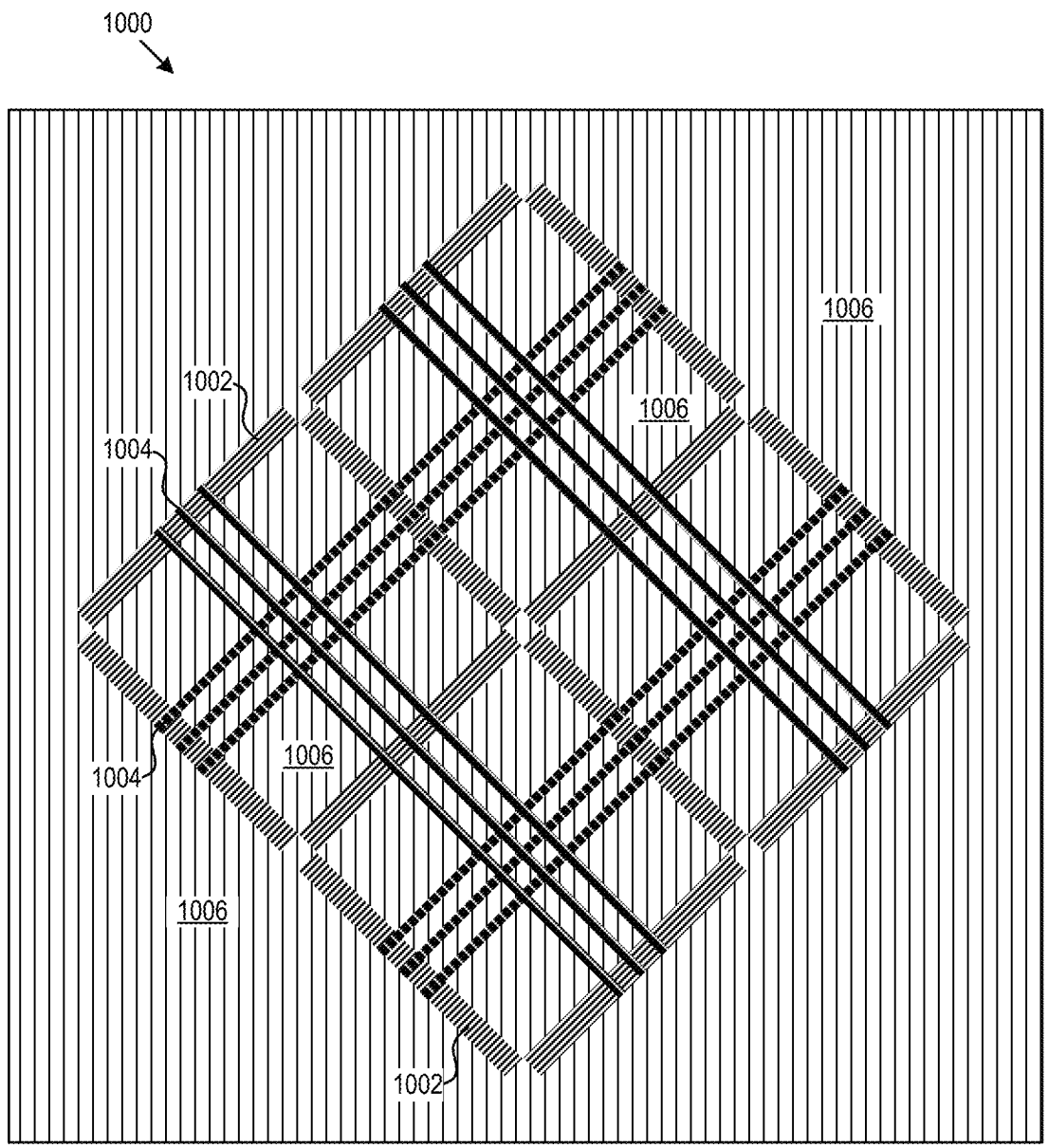
FIG. 10 shows an example diagonal crossing line array.

FIG. 10 shows an example diagonal crossing line array 1000. The diagonal crossing lines 1002, 1004 may have multiple thicknesses, and may divide the background 1006 into multiple regions. Accordingly, both the diagonal crossing lines 1002, 1004 and background 1006 may accommodate one or more panel sets.

Figure 11:
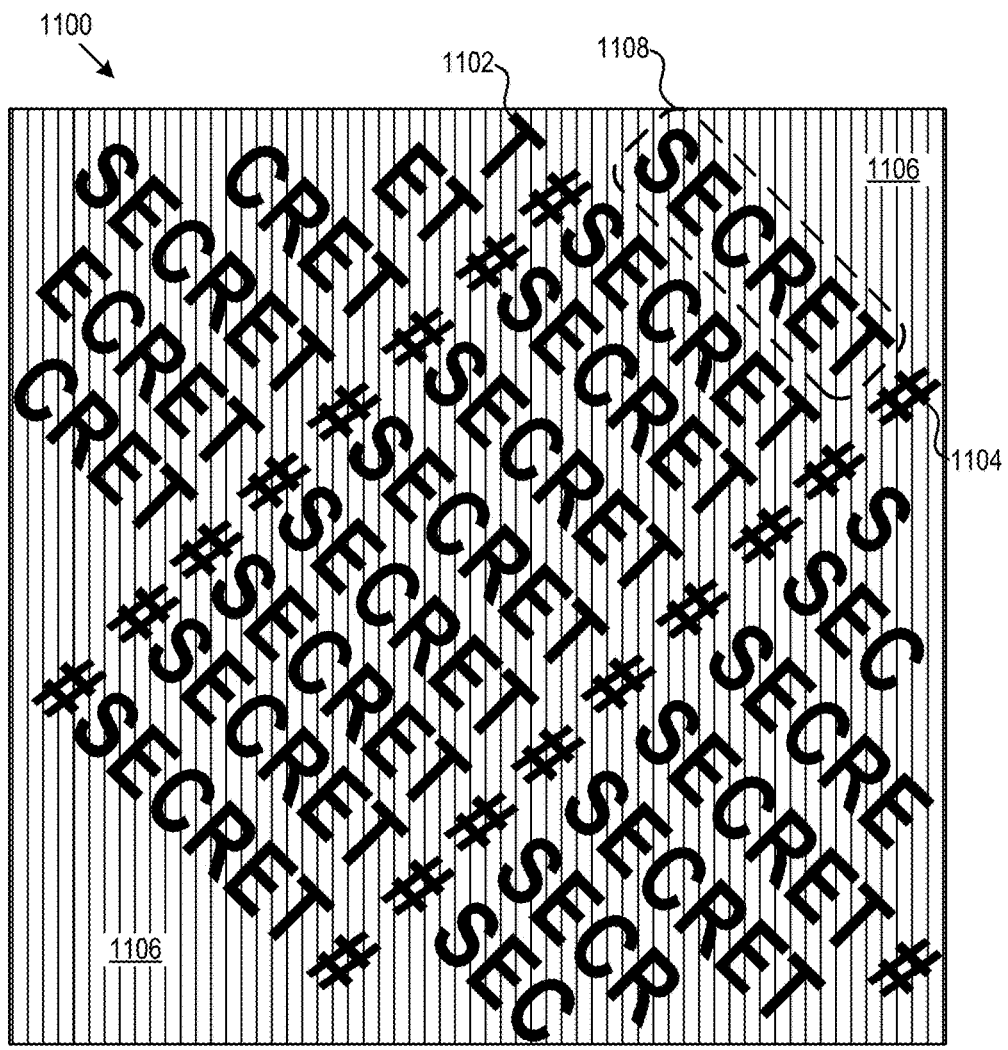
FIG. 11 shows an example letter array.

FIG. 11 shows an example letter array 1100. In the example letter array 1100, letters 1102 and other characters 1104 (e.g., letters, numerals, ASCII characters, UNICODE characters, or other characters) may be placed over a background 1106. In some cases, the letters may form words 1108. Words may focus attention on the window array rather than the blocked polarization image. Additionally or alternatively, letter arrays with dense grouping of multiple-size characters may increase difficulty in resolving particular characters present in a blocked polarization image. Visual mixing between the letter-shaped panels and the content of the blocked polarization image may increase uncertainty when trying to determine the character content of the blocked polarization image. In many cases, sensitive information displayed on a view screen may include text. Accordingly, array patterns that efficiently disrupt the ability to read text may be effective in frustrating eavesdropping (e.g., intentional or incidental).

Figure 12:
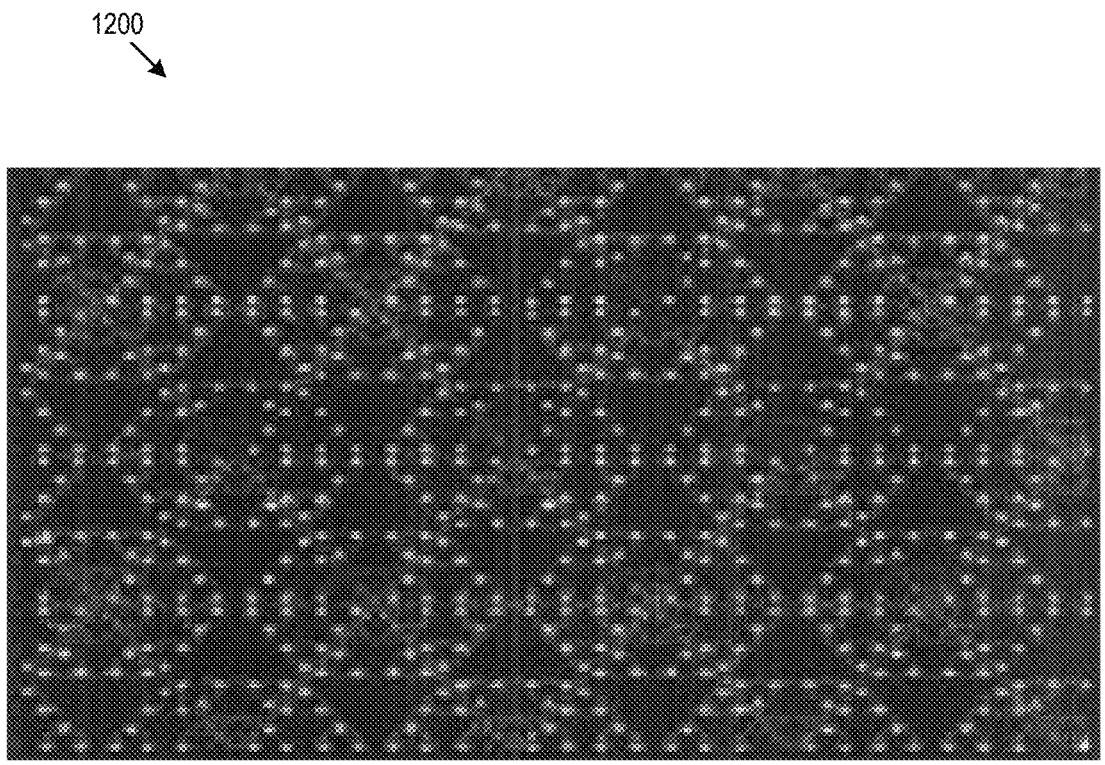
FIG. 12 shows an example fractal array.

FIG. 12 shows an example fractal array 1200. In the example fractal array 1200, the arrangement of panels has features that are self-reproducing on multiple size scales. Accordingly, the arrangement may disrupt viewing of content from view screens at various size scales and distances. In some cases, a maximum feature size may be enforced to ensure that no region large enough to sustain viewing of a view screen occurs for any one blocked polarization.

Figure 13:
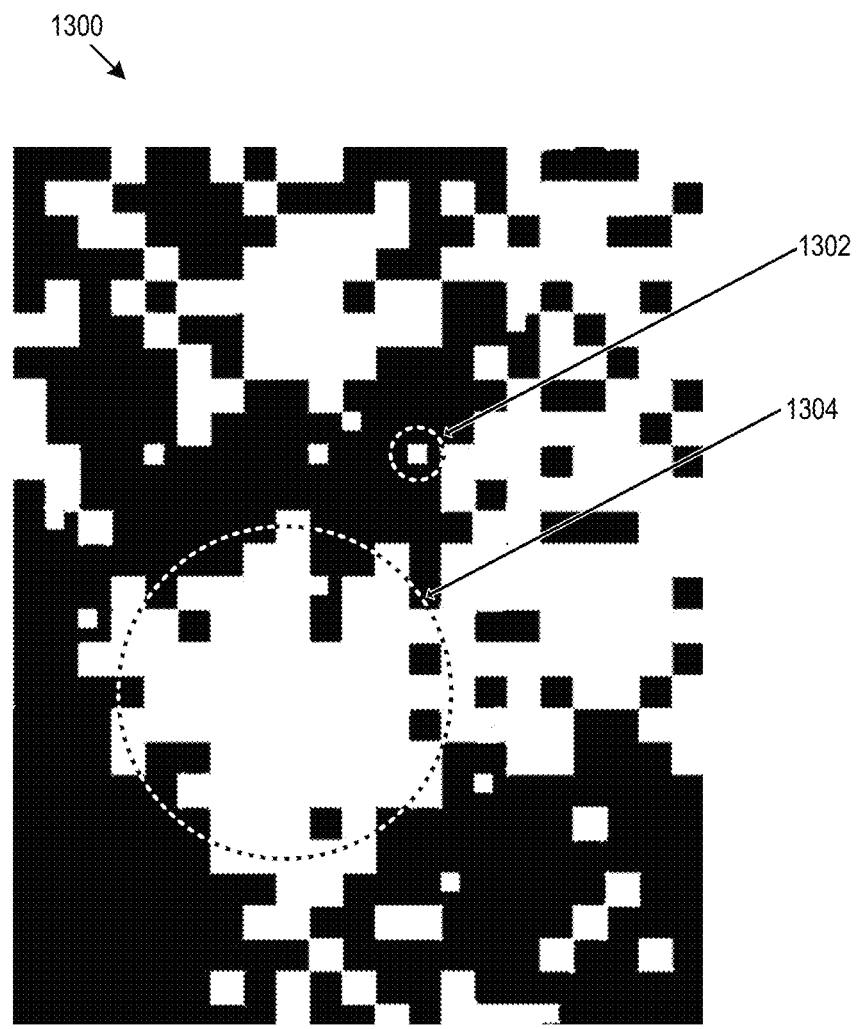
FIG. 13 shows an example multi-scale pattern array.

FIG. 13 shows an example multi-scale pattern array 1300. In the example multi-scale pattern array 1300, the arrangement of panels has features 1302, 1304 at multiple size scales. However, the features may not necessarily be self-reproducing. Accordingly, the arrangement may disrupt viewing of content from view screens at various size scales and distances. In some cases, a maximum feature size may be enforced to ensure that no region large enough to sustain viewing of a view screen occurs for any one blocked polarization. In the example multi-scale pattern array, the pattern is a pixelated pattern with straight-edged features. However, multi-scale patterns may include patterns with curved edges and no pixelation. Other examples of multi-scale patterns may include CADPAT or MARPAT (e.g., "digicamo") combat uniforms.

In some implementations, the array may be arranged in accord with a mathematical tiling algorithm. Mathematical tiling algorithms may include periodic, aperiodic with n-fold symmetry, aperiodic, pseudorandom, and/or quasi-crystal patterns. In some implementations, tiling algorithms may qualify for membership in one or more of these groupings.

In some implementations, tiling patterns may be generated and then the tiles may be assigned to different panel groupings. The different panel groupings may block different polarizations. By dividing the tiling pattern into multiple groupings, multiple polarizations may be cloaked by the tiling pattern. In some cases, the tiles within the patterns may be assigned to different grouping based on the shape of the tile, the spatial orientation of the tile in the pattern, a numerical value (e.g., random, pseudorandom, deterministic, ordinal, or other numerical value) which may be assigned during pattern generation. In some cases, deterministic coloring schemes may be used to generate colorful images using mathematical tiling algorithms. Virtually any such deterministic coloring scheme for image generation may be used to divide a tiling pattern for multiple-polarization cloaking by assigning colors or groups of colors to respective polarization filtering panel groups.

In some cases, quasi-crystal mathematical tiling patterns may be generated using a "seed" input. The seed input may be an initial arrangement of shapes (e.g., starting conditions) from which the tiling pattern is "grown" by the algorithm. In some implementations, this growth processing may share similar pattern recreation characteristics with the process of crystal growth. The initial seed pattern may be used to control tile shape and the overall semi-repeating pattern/symmetries of the quasi-crystal tiling pattern. The base tile shape may include triangles, rhomboids/squares/rectangles or other quadrilaterals, hexagons, other polygons, or a combination thereof.

Two examples of quasi-crystal tiling patterns may include Penrose tiling algorithm and Danzer's seven-fold tiling pattern algorithm. In some cases, Danzer's seven-fold tiling pattern algorithm may have a greater degree of apparent randomness than Penrose tiling algorithms.

Aperiodic tiling patterns, including quasi-crystal patterns, may include random and/or pseudorandom features, while at the same time including repeating and semi-repeating features and symmetries. In some cases, the pattern (both random and regular features) may have a physically disruptive effect when used to block polarized images. However, the aperiodic tiling patterns may further have a psychologically disruptive effect, e.g., such patterns may distract a viewer and draw focus to the pattern rather than sensitive information displayed on a view screen behind the pattern. In some cases, the intentional nature of the repeated and/or symmetrical features may draw the attention of the viewer, while the random/pseudorandom features cause the viewer to remain focused on the tiling pattern as the viewer attempts to determine whether the pattern is random. In some cases, aperiodic tiling patterns may be more aesthetically than purely random patterns.

In some implementations, an aperiodic tiling pattern may disrupt viewing at different distances e.g., different distances from the view screen and different distances between the viewer and the window with the aperiodic tiling pattern. When a viewer is close to the tiling pattern the amplitude (e.g. apparent shape size) of the tiling pattern is greater than when viewer is far from the tiling pattern. Amplitude features may include tile parameters such as shape variation, size variation, orientation variation, other single tile parameters, or any combination thereof. When a viewer is close to the tiling pattern the frequency (e.g. amount of pattern visible and repetition of regular features) of the tiling pattern is less than when viewer is far from the tiling pattern.

Frequency features may include macro (e.g., multiple-tile) pattern repetition, macro symmetries, or other multiple-tile features. In some cases, the level and randomness (e.g., pseudorandomness) and complexity of the pattern may affect the level of psychological disruption experienced by the viewer. Selection of a pattern that provides complexity and randomness through amplitude features may provide disruption when the viewer is close to the array. Selection of a pattern that provides complexity and randomness through frequency features may provide disruption when the viewer is far from the array. Selection of a pattern that provides complexity and randomness through both frequency and amplitude features may disrupt viewing at multiple different viewing distances, or over a range of viewing distances.

Figure 18:
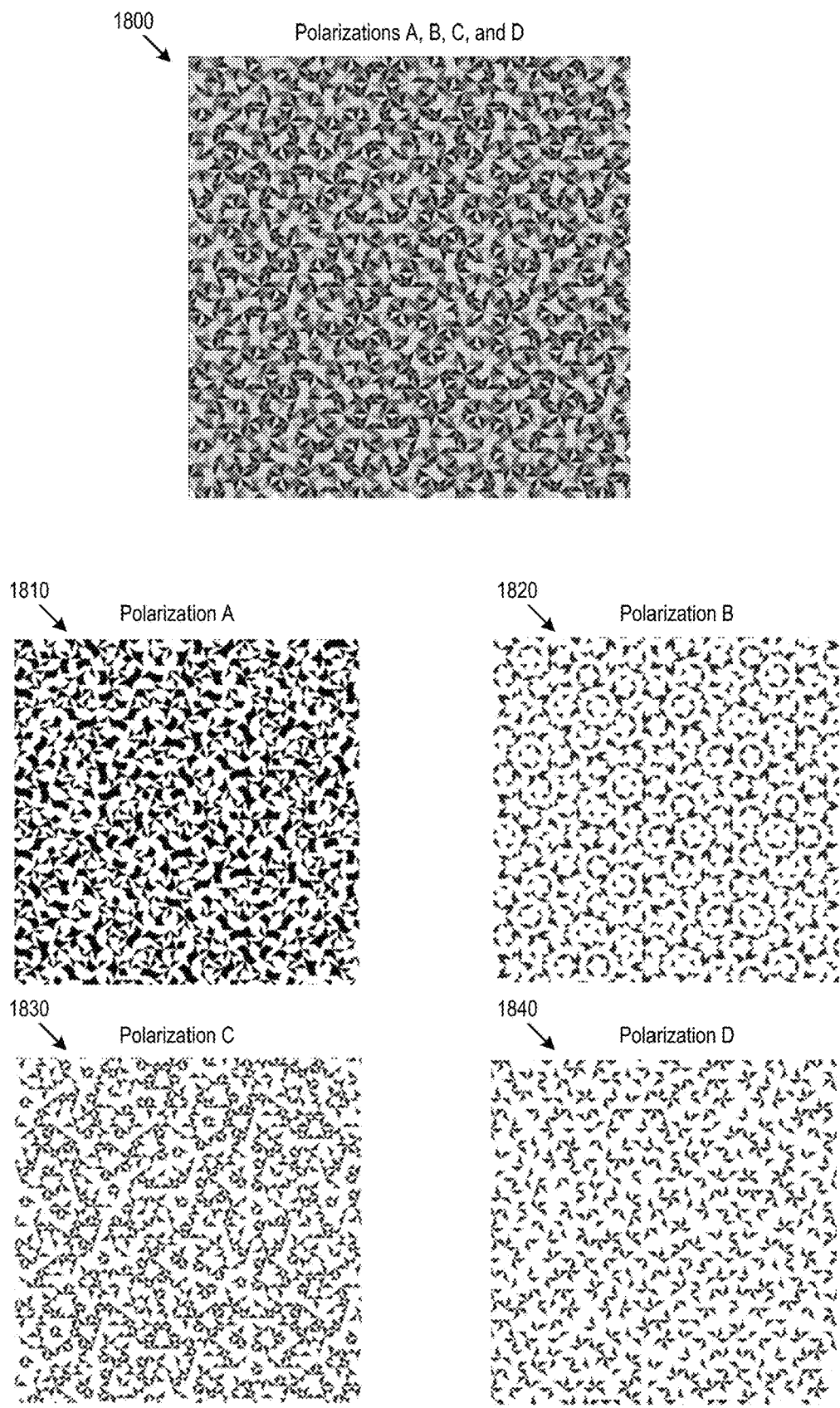
FIG. 18 shows an example aperiodic tiling array.

FIG. 18 shows an example aperiodic tiling array 1800. The example aperiodic tiling array 1800 includes features of a Danzer's seven-fold tiling algorithm based tiling pattern. The example aperiodic tiling array 1800 may be derived from a Penrose tiling algorithm. However, in other implementations, a Danzer's seven-fold tiling algorithm may be used to generate a tiling pattern. The multiple (e.g., four) shades used in the example aperiodic tiling array 1800 represent the different tiling groups that disrupt images in different polarizations. The example aperiodic tiling array 1800 may be decomposed in to example sub-arrays 1810, 1820, 1830, 1840 by polarization type. In other words, the example sub-arrays 1810, 1820, 1830, 1840 could be superimposed or stacked on to one another to generate the example aperiodic tiling array 1800. In this case, the example aperiodic tiling array 1800 may disrupt four different polarizations (e.g., polarizations A, B, C, D). However, using different tile assignment mechanisms (e.g., coloring algorithms as discussed above), greater of fewer polarization types may be blocked.

FIGS. 4-13 and 18 show various examples of patterns that may be used to frustrate viewing of sensitive view screen content through a window array. However, other patterns may be used.

For example, a wealth of patterns have been used for security envelope interior designs to frustrate attempts to read unopened mailings. Such security envelope designs may be adapted to window array designs. For example in one adaptation technique, the each of multiple tones used to create the security envelope pattern may be assigned individual polarization to block. The security envelope pattern may be scaled such that a person may be able to resolve the security envelope features at a distance (e.g., 1-3 meters) at which a passerby may stand from the window array.

As yet another example, multi-tone images of virtually any type may be used. Each of the multiple tones may be assigned a particular polarization to block. For example, multi-tone images of one or more historical figures, flowers, animals, brand insignias, or other images may be rendered in the window array. The images may draw the focus of the viewer to the plane of the window array and away from the view screen content.

The window arrays may be patterned in liquid crystal polymer (LCP) materials or other materials (such as CLCs), which allow for high-resolution waveplate patterning. For example, techniques, such as those discussed in U.S. Pat. No. 9,122,013, may be used. As discussed therein: for photopatterned surface alignment, alignment layers may provide a defined orientation of liquid crystal (LC) molecules in contact with the aligning surface. A photoaligned layer may be oriented by light exposure, e.g., potentially without any mechanical contact and consequently enables an arbitrary orientation to be transferred to the LC molecules. Exposing a substrate coated with specialized photo-reactive polymers (azo-dyes, Rolic Research Linear Photopolymers) to linearly polarized UV light (LPUV) induces preferential alignment direction in the direction of polarization and subsequent alignment of LC molecules coming in contact with the photoreactive alignment layer. A spatial variation in alignment direction can be induced by area-selectively exposing the alignment layer to differently conditioned LPUV light, for example, with varying intensities, incidence angles, or polarization directions. Then, the anisotropic LPP layer may be coated with a formulation of the LC pre-polymer containing also a photoinitiator. After aligning the LC pre-polymer by the subjacent LPP layer, the film may be cross-linked and polymerized with unpolarized UV light, providing a permanently oriented patterned retarder.

As further discussed therein: variation in retardance may be achieved through thickness patterning of liquid crystal polymer retardance layers. A liquid crystal polymer may be wet coated on a substrate with uniform alignment layer coated on the substrate. A UV photomask exposure may be used to photopolymerize specific regions into a planar alignment. The substrate may be then treated with tetrahydrofuran (or other developer chemical) to dissolve liquid crystal polymer that has not been cross-linked and polymerized. This may result in regions with no retardance and regions of retardance dependent on liquid crystal polymer birefringence and layer thickness.

As further discussed therein: the wave retarder may be patterned by changing the thickness of the birefringent material through replicate mold liquid crystal polymer printing. PDMS (polydimethylsiloxane) polymer mold stamps can be created using a master photolithographically produced polymer mold and subsequently used to stamp patterns in polymeric liquid crystals. The liquid crystal polymer may be cured with the stamp imprinted into the material leaving a residual patterned liquid crystal retarder. Alignment may be generated through the interaction of liquid crystal polymer with treated imprinting PDMS surface such that additional alignment layers are not necessary.

As further discussed therein: the wave retarder may be patterned by changing the thickness of the birefringent material through coating the material on a substrate with varying surface height. To vary the surface height, a micro embossing, e.g., applying a micro patterned stamp and moldable non-birefringent transparent substrate such as polyethylene (PET) polyvinyl alcohol (PVA) or polyimide, may be sued. This patterned substrate may then be peeled from the mold and coated with a printable polymer liquid crystal or other birefringent material.

As further discussed therein: the wave retarder may be patterned by changing the birefringence through mixing photoreactive alignment layers directly into the liquid crystal polymer mixtures. The alignment of the liquid crystal polymer may be controlled throughout the volume of the liquid crystal polymer mixture. This mixture may be applied to a substrate with a uniform planar alignment layer. The sample may be UV photomask exposed in one region with one UV polarization and another region with a different polarization. The different polarization exposures create a helical or twisted liquid crystal polymer structure with different chirality (left-handed, right-handed), which in turn may cause different amounts of retardance.

As further discussed therein: the wave retarder may be patterned by changing the birefringence through photoaligned cholesteric liquid crystals. Cholesteric liquid crystals (CLC's) have a helical or twisted structure. CLC's may be engineered such that the amount of chirality (or helical twisting power) may be modulated through UV light exposure dose, e.g., long exposure to UV may modulate the twist and thus adjust the retardance of a CLC. Patterned retardance layers may be formed through exposure of different domains of CLC to different dosage amounts of UV light through multiple photomasks.

Accordingly, a thin film waveplate material (e.g., wave retarder material) may be created with adjacent regions with differently oriented fast axes. Accordingly, a half-waveplate region oriented at 0 degrees may be printed adjacently to a half-waveplate region oriented at 22.5, 45, 67.5 or other orientation. Similarly using the techniques discussed above or other patterning techniques, half-waveplate regions may be printed densely with quarter-waveplate regions. Using such printing a dense array of differing orientation and retardance-level waveplate regions. In some implementations, stamping, printing, or patterning techniques other than those discussed above with regard to U.S. Pat. No. 9,122,013 may be used.

View Screen Cover and Polarizer Window

Figure 14:
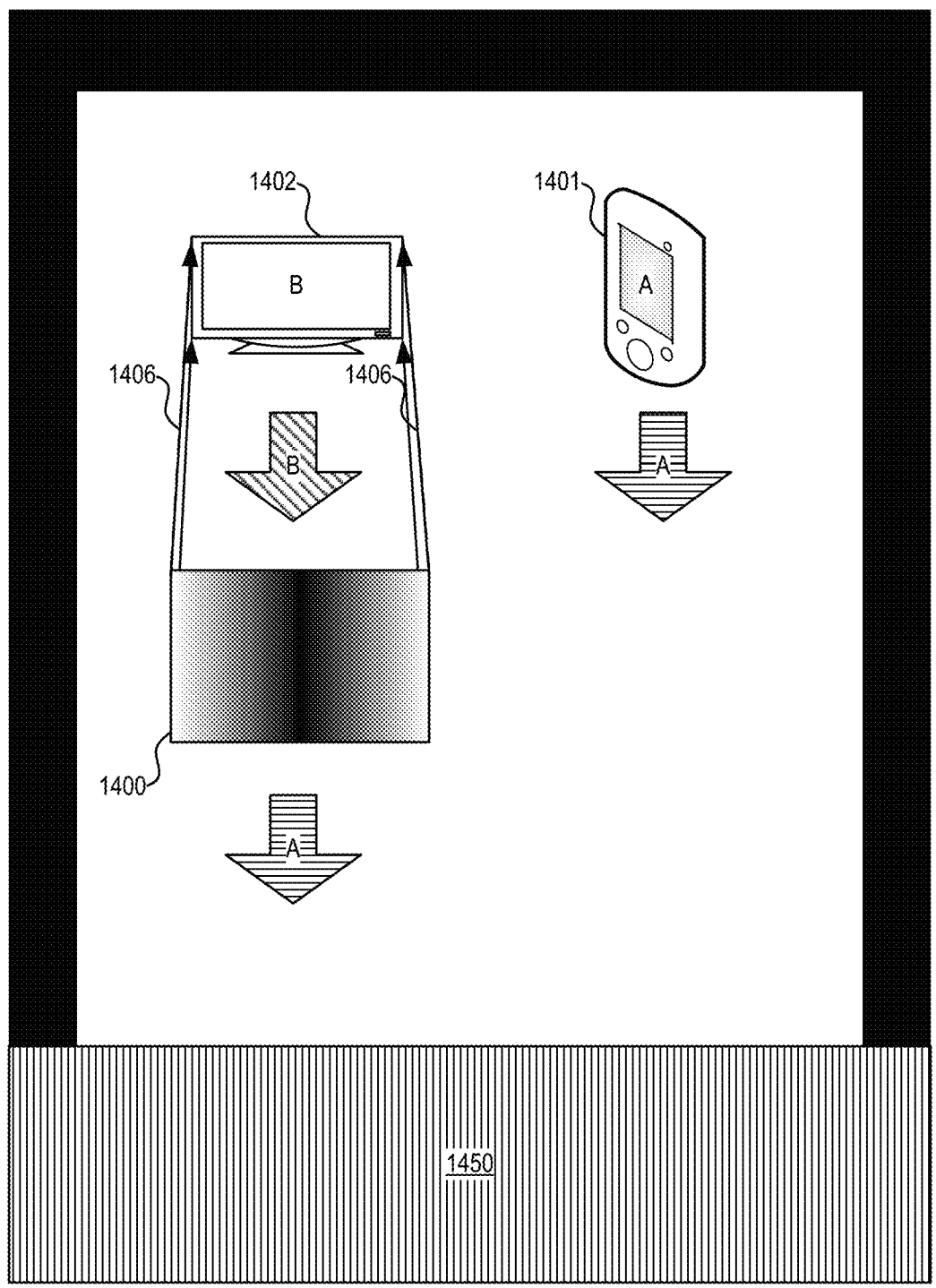
FIG. 14 shows an example view screen cover and polarizer window.

FIG. 14 shows an example view screen cover 1400 and polarizer window 1450. The example polarizer window 1450 blocks light in a specific polarization (polarization type A). For example, the polarizer window may be selected to block 90-degree polarization because displays, in some cases have vertically polarized output. However, virtually any polarization may be selected for the polarizer window.

The view screen 1402 may generate output in a view screen output polarization (polarization type B). If the view screen output polarization (e.g., for view screen 1401) is the same as the specific polarization, the view screen cover 1400 may be omitted.

When the view screen output polarization is different from the specific orientation, the view screen cover 1400 may be mounted using the mount 1406 such that it is between the view screen 1402 and the polarizer window 1450. The mount 1406 may include an adhesive layer such that the view screen cover may be applied to the view screen's face. Additionally or alternatively, the mount may include fasteners such that it may be affixed to the bezel or sides of the view screen and covering the screen. Additionally or alternatively, the mount may include a window frame and wall recess (not shown) such that the view screen may be placed within the recess between the view screen cover and the view screen cover may be held in place by the window frame mount. Virtually, any mount capable of holding the view screen cover 1400 in front of the view screen may be used.

The view screen cover may further include a waveplate with and orientation and retardance level selected to covert the view screen output polarization into the specific polarization. For example, if the specific polarization was 0 degrees and the view screen output polarization were 45 degrees, the selected view screen cover half-waveplate may have its fast axis oriented at 22.5 degrees. In another example, if the specific polarization was 0 degrees and the view screen output polarization were 135 degrees, the selected view screen cover half-waveplate may have its fast axis oriented at 67.5 degrees. In another example, if the specific polarization was 0 degrees and the view screen output polarization were left-handed circular, the selected view screen cover quarter-waveplate may have its fast axis oriented at 45 degrees. For left-handed circularly polarized light, from the point of view of the source, the direction of e-field rotates clockwise about the direction of propagation. Similarly, for right-handed circularly polarized light, from the point of view of the source, the direction of e-field rotates counter-clockwise about the direction of propagation. Orienting a quarter-waveplate's fast axis at 135 degrees may convert right-handed circularly polarized light to 0 degree linearly polarized light. Any half-waveplate may convert right-handed circularly polarized light to left-handed circularly polarized light or vice versa.

Figure 15:
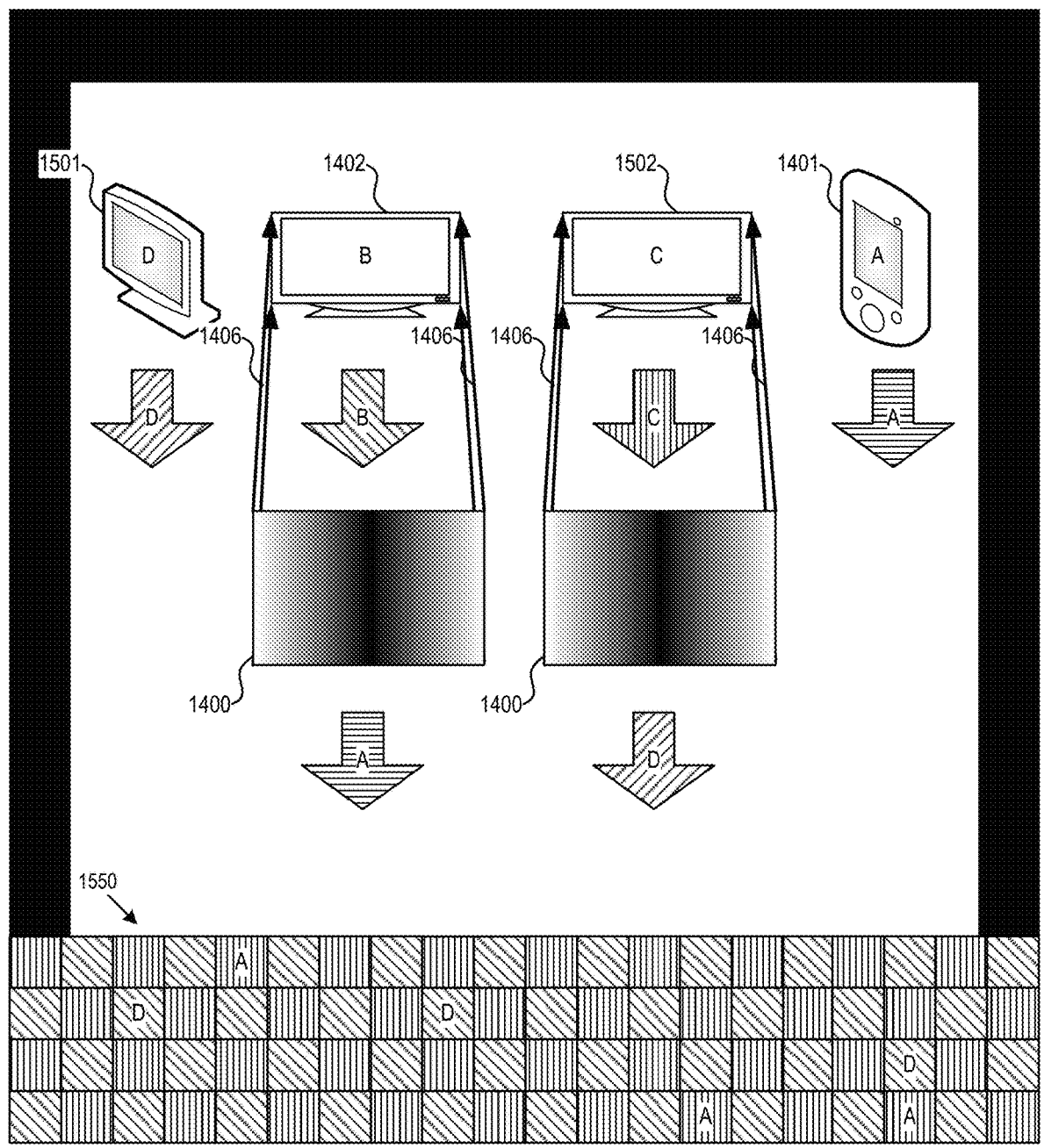
FIG. 15 shows an example view screen cover and window array.

In some implementations, the polarizer window may include a window array. FIG. 15 shows an example view screen cover 1400 and window array 1550. The window array 1550 may render unintelligible view screen output in multiple polarizations (e.g., polarizations types A and D). Accordingly, the view screen cover 1400 may be omitted for view screens 1401, 1501 with view screen output in any of the polarization that the window array disrupts. Further, the view screen cover 1400 may convert the view screen output polarization (for view screens 1402, 1502) into any of the polarizations the window array disrupts. Accordingly, the same view screen cover 1400 may be used to covert multiple different view screen output polarizations into disrupted polarizations.

Figure 16:
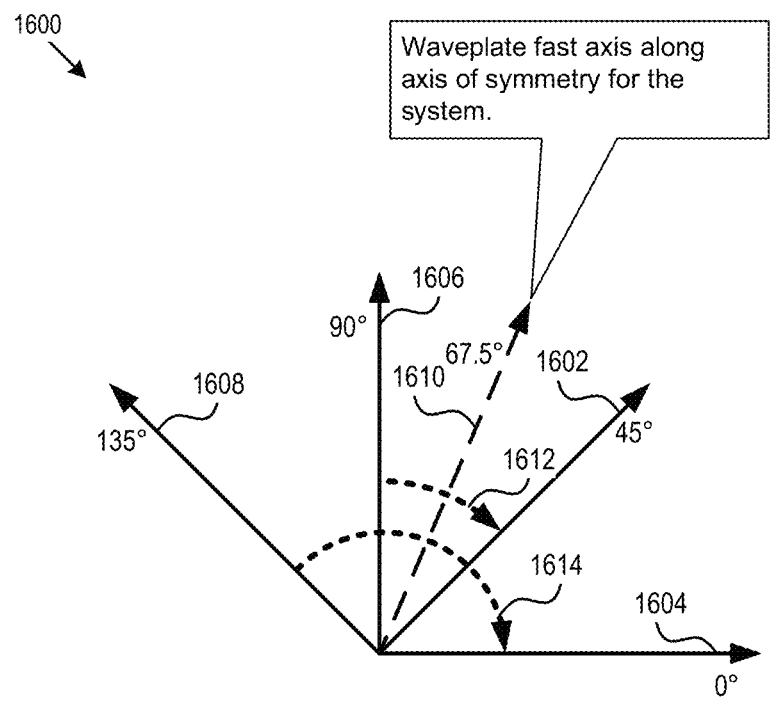
FIG. 16 shows an example plot of polarization disruption scenario.

For example, a window array that disrupts two different polarizations and one view screen cover orientation may be used to disrupt four different linear polarizations. FIG. 16 shows an example plot 1600 of polarization disruption scenario.

In the example scenario, a window array disrupts view screen polarization output at 45 degrees 1602 and 0 degrees 1604. Accordingly, for view screens with output at 45 degrees or 0 degrees, a view screen cover may be omitted. For view screens with output at 90 degrees 1606 and 135 degrees 1608 a view screen cover with a half-waveplate oriented at 67.5 degrees 1610 may be used. The view screen cover may convert 1612 the 90-degree polarization to a 45-degree polarization, and convert 1614 the 135-degree polarization to a 0-degree polarization. If the window array instead disrupted at 90 and 135 degrees, the same half-waveplate oriented at 67.5 degrees may instead be used to convert 45 degree and 0 degree view screen outputs to 90 and 135 degrees, respectively.

In another example scenario, the window array may disrupt view screen polarization output at 135 degrees and 0 degrees. Accordingly, for view screens with output at 135 degrees or 0 degrees, a view screen cover may be omitted. For view screens with output at 90 degrees and 45 degrees at view screen cover with a half-waveplate oriented at 22.5 degrees may be used. The view screen cover may convert the 90-degree polarization to a 135-degree polarization and the 45-degree polarization to a 0-degree polarization. If the window array instead disrupted at 90 and 45 degrees, the same half-waveplate oriented at 22.5 degrees may instead be used to convert 135 degree and 0 degree view screen outputs to 90 and 45 degrees, respectively.

Other combinations, where window-array-disrupted polarizations orientations along with the converted orientations are symmetric about the orientation of the view screen cover may be used.

In some implementations, an operator may determine the polarization of the output of a view screen using a polarization testing device. Once the operator determines the polarization of the output, a view screen cover, polarizer window, window array or any combination thereof may be selected based on the polarization. Virtually any device that may allow an operator to identify different linear and/or circular polarizations may be used.

Figure 17:
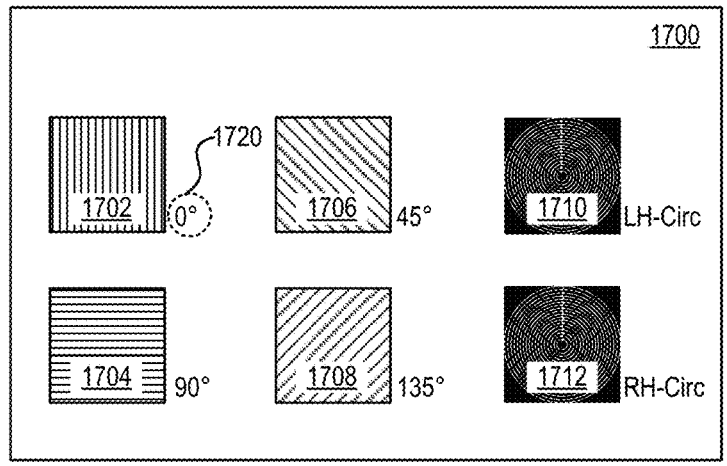
FIG. 17 shows an example card with multiple different polarizer panels and a complimentary technique for polarization determination.
Figure 17:
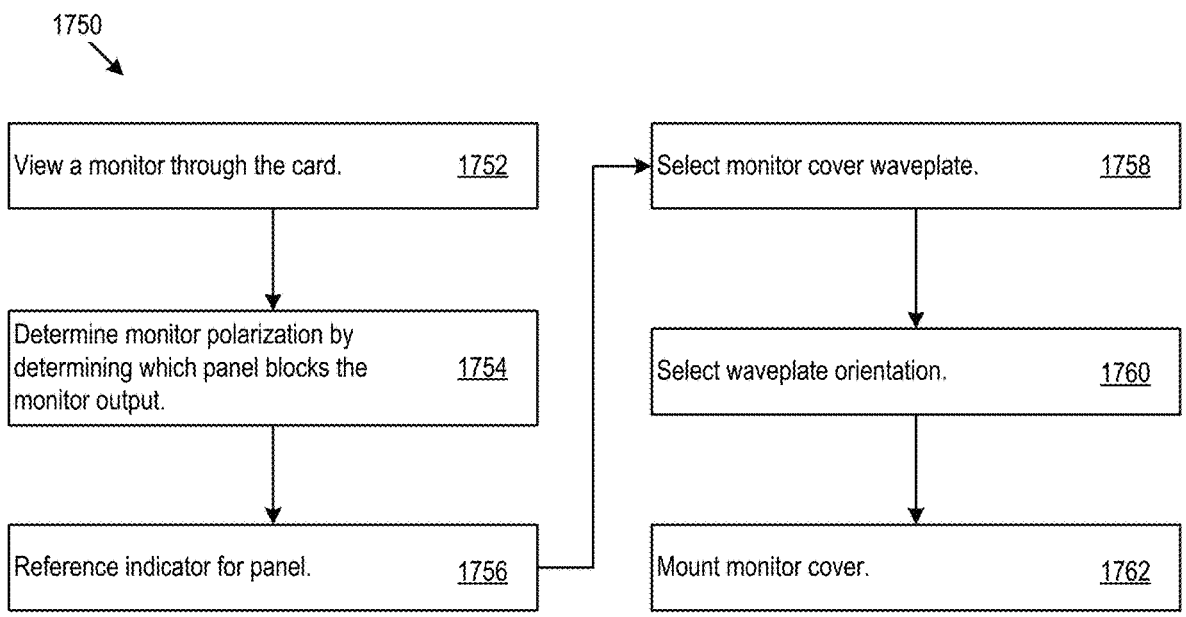

In some implementations, the polarization determination device may include a card with multiple different polarizer panels. FIG. 17 shows an example card 1700 with multiple different polarizer panels 1702, 1704, 1706, 1708, 1710, 1712, and a complimentary technique for polarization determination 1750. The example card 1700 may include one or more panels 1702, 1704, 1706, 1708, 1710, 1712 that are filters for possible polarization output types for view screens. The example card 1700 includes a 0-degree filter panel 1702, a 90-degree filter panel 1704, a 45-degree filter panel 1706, a 135-degree filter panel 1708, a left-hand circular filter panel 1710, and a right-hand circular filter panel 1712. The card 1700 may include indicators 1720 (e.g. identifiers of polarization type, panel indices, or other referenceable indicators) associated with each panel. The operator may view a view screen through the card 1700 (1752). The operator may determine the polarization output of the view screen by determining which panel blocks the view screen output (1754). Then the operator may reference the indicator for that panel (1756). In various cases where a view screen cover system is used, including after determination of polarization with the card 1700 or other polarization determination device, a view screen cover waveplate may be selected responsive to the polarization (1758). Once the waveplate is selected, an orientation for the waveplate may be selected (1760). The operator may mount the view screen cover to the view screen (1762).

The example card 1700 includes panels for 1702, 1704, 1706, 1708, 1710, 1712 six different possible view screen outputs. However, panels for other possible polarizations may be included in some implementations. Some implementations, may omit one or more of the polarization type tested by the example card. For example, another example card may include linear polarization types but omit one or more circular polarization types or vice versa.

In some implementations, one or more of the panels on the card may be rotatable. The rotatable panel may include a dial indicator that may indicate the orientation of the panel. A rotatable panel may be used to test multiple different linear polarization orientations with a single panel polarizer capable of being placed in multiple relative orientations.

Example View Screens

In some implementations, projected and/or writing-surface view screens may have polarized outputs. For example, a projector may include a polarizer over the output lens of the projector or included within the projector such that the output of the project includes polarized light. The projector may project the polarized output onto a polarization preserving screen, such as a silver-based screen. Accordingly, the output may be blocked or rendered unintelligible using the above-discussed view screen cover system and/or window panel array. The polarization orientation of the projector output may be determined using a polarization determination device, such as the card 1700. In some cases, the polarizer may be extended over the screen. Accordingly, unpolarized projector output light may be polarized once incident on the polarizing screen. The polarized reflected light may be blocked or rendered unintelligible using the above-discussed view screen cover system and/or window panel array.

Figure 19:
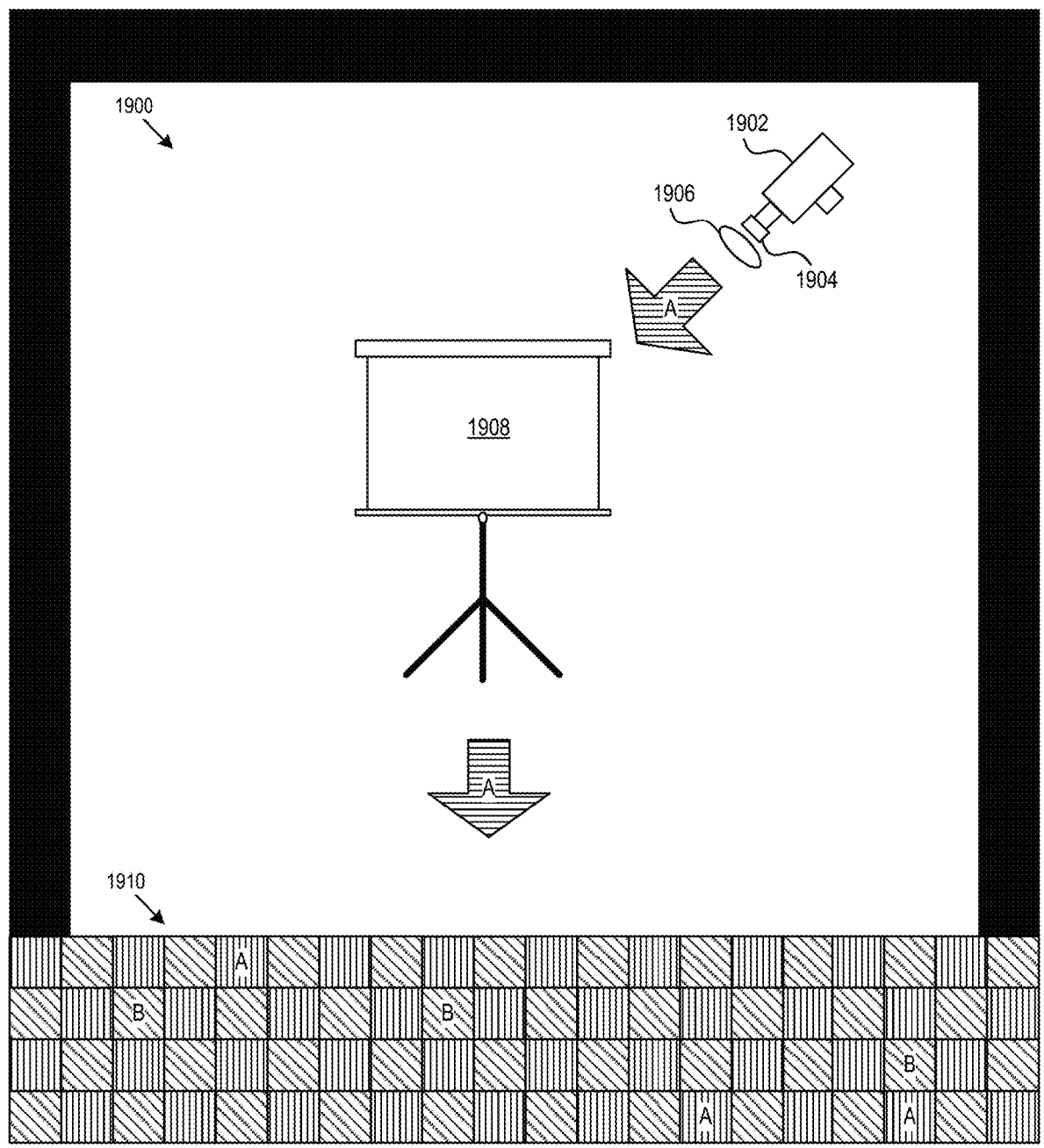
FIG. 19 shows an example projected view screen system.

FIG. 19 shows an example projected view screen system 1900. The projected view screen system 1900 includes a projector 1902 with an output lens 1904. A polarizer 1906 covers the output lens 1904 generating output light with polarization type A. The projector 1902 may project an image on the polarization maintaining screen 1908. The image projected on the polarization maintaining screen 1908 is obscured when viewed through the window array 1910, which blocks light of polarization types A and B.

In an example, a writing-surface view screen may include a writing surface such as a whiteboard. The whiteboard may include a backlit whiteboard, e.g., with incandescent, LED, or fluorescent backlighting, which in some cases may be diffused to generate even lighting across the whiteboard. The whiteboard may include a polarizer layer that may polarize the output from the backlighting. A user may write directly on the polarizer layer, or in some implementations on a substrate, e.g., such as a polymer layer, forming the front surface of the whiteboard. The polarizer layer and/or front surface may be transmissive in front of an absorptive background, such that the whiteboard appears black when not backlit or when the polarized backlighting is cloaked. Writing on the front surface of the whiteboard may be visible when backlit and invisible or otherwise obscured when the backlighting is not present or cloaked.

In some cases, cloaking markers may make cloaking marking that are visible when backlit and invisible or otherwise obscured when the backlighting is not present or cloaked. Markers may include, e.g., dry-erase markers, permanent markers, washable markers, pens, pencils, styluses, or other writing utensils. Non-cloaking markers may make non-cloaking marking that are visible when backlit and still visible or otherwise obscured when the backlighting is cloaked. Any or a combination of cloaking and non-cloaking markers may be used. For example, non-cloaking markers may be used to record non-sensitive or non-classified information on a whiteboard while cloaking markers may be used to record sensitive or classified information on the same whiteboard.

In some cases, markers that make marks which fluoresce when exposed to light or marks that alter or remove polarization may be used as non-cloaking markers with a writing-surface view screen. Markers that make marks which do not fluoresce when exposed to light and/or marks that do not alter or remove polarization may be used as cloaking markers with a writing-surface view screen. Non-cloaking markers may be manufactured by constructing writing utensils with pigments that fluoresce when exposed to light. Such markers may create non-cloaking markings that produce light with a polarization not necessarily aligned with the light incident on the non-cloaking marking. Similarly, non-cloaking markers may be manufactured by constructing writing utensils that generate marks, e.g., via a polymer residue, that remove polarization from light incident on the marking. The removal of polarization may frustrate the cloaking process.

Table 1 lists example markers that may be used as non-cloaking and cloaking markers with a writing-surface view screen.

TABLE 1

Cloaking and Non-Cloaking Markers

| Brand | Color | Cloaking | Non-Cloaking |
|---|---|---|---|
| MAGIC MARKER | Red | X | |
| MAGIC MARKER | Green | X | |
| MAGIC MARKER | Blue | X | |
| STAPLES | Red | X | |
| STAPLES | Black | X | |
| STAPLES | Blue | X | |
| STAPLES | Green | X | |
| EXPO High Intensity | Red | | X |
| EXPO High Intensity | Black | X | |
| EXPO High Intensity | Blue | X | |
| EXPO High Intensity | Green | X | |

TABLE 1-continued

Cloaking and Non-Cloaking Markers

| Brand | Color | Cloaking | Non-Cloaking |
|---|---|---|---|
| EXPO Low Odor | Black | X | |
| EXPO Low Odor | Pink | X | |
| EXPO Low Odor | Brown | | X |
| EXPO Low Odor | Cyan | X | |
| EXPO Low Odor | Orange | | X |
| EXPO Low Odor | Blue | X | |
| EXPO Low Odor | Dark Brown | X | |
| EXPO Low Odor | Light Green | | X |
| EXPO Low Odor | Dark Green | X | |
| EXPO Low Odor | Purple | X | |
| EXPO Low Odor | Violet | X | |
| EXPO Low Odor | Red | | X |

Figure 20:
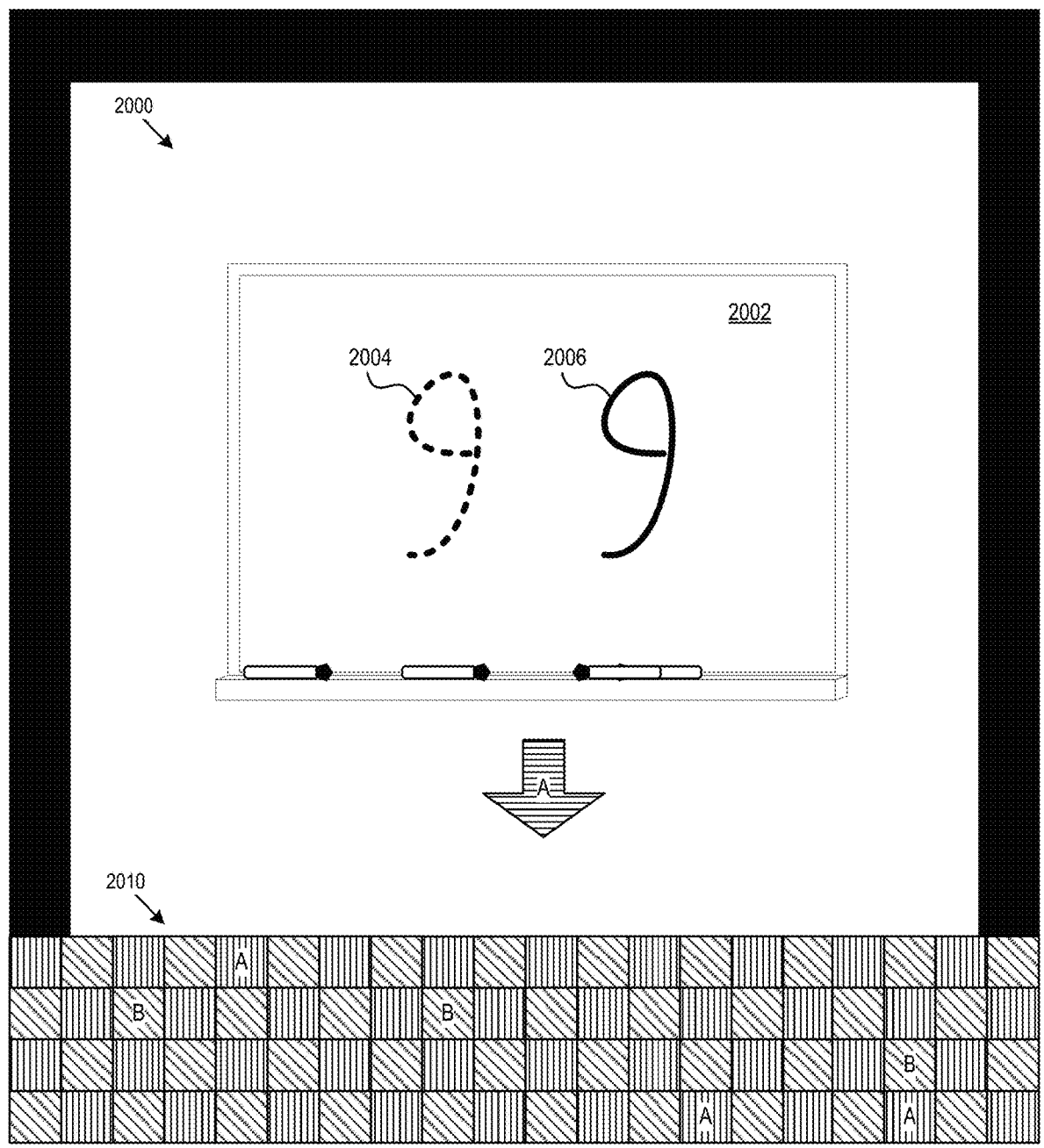
FIG. 20 shows an example writing-surface view screen system.

FIG. 20 shows an example writing-surface view screen system 2000. The writing-surface view screen system 2000 includes a writing-surface view screen 2002 that is backlit with polarized light of polarization type A. Markings 2004, 2006 on the surface of the writing-surface view screen may be made with cloaking and/or non-cloaking markers. Cloaking marking 2004 is obscured when viewed through the window array 2010, which blocks light of polarization types A and B. Non-cloaking marking 2006 is not obscured when viewed through the window array 2010.

Figure 21:
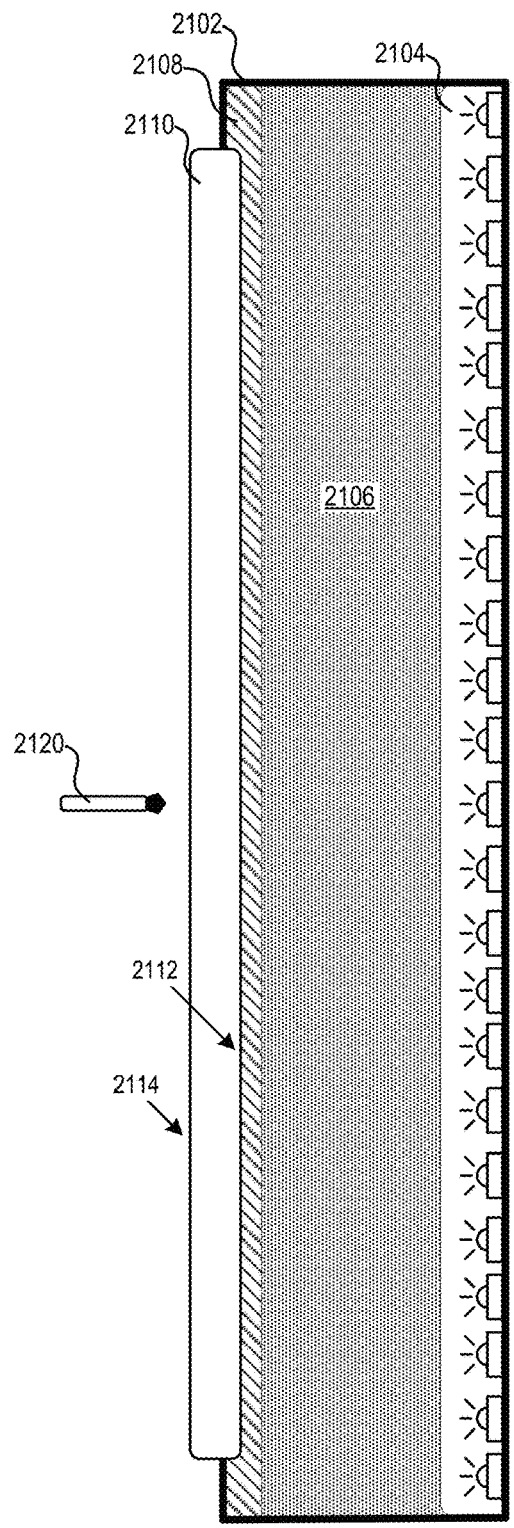
FIG. 21 shows a side view of an example whiteboard-type writing-surface view screen.

FIG. 21 shows a side view of an example whiteboard-type writing-surface view screen 2100. The example whiteboard-type writing-surface view screen 2100 may include a chassis 2102, a backlight 2104, a diffuser layer 2106, a polarizer layer 2108, and a substrate 2110.

The chassis 2102 may house the backlight 2104, diffuser layer 2106, polarizer layer 2108, and substrate 2110. The chassis may be formed from a material with rigidity such that the backlight 2104, diffuser layer 2106, polarizer layer 2108, and substrate 2110 may be housed without shifting relative to one another. For example, the chassis 2102 may be formed from aluminum, steel, other metal, plastic, rubber, or other material. The diffuser layer 2106 may diffuse the output of the backlight 2014 to generate consistent lighting across the whiteboard-type writing-surface view screen 2100. The polarizer layer 2108 may polarize the light output after diffusion by the diffuser layer 2106.

The polarizer layer 2108 may be adhered to the inner surface 2112 of the substrate 2110. The front surface 2114 of the substrate 2110 may be marked, e.g., using a marker 2120. The polarized light output from the polarizer layer 2108 may pass through the substrate 2110, which may allow viewing of the marks made on the front surface 2114 of the substrate 2110. However, cloaking marks may be obscured when the polarized light output of the polarizer layer is blocked, e.g., by a window array system or view screen cover system.

Although not shown, systems capable of obscuring only a single polarization may be used with the writing-surface view screen systems (e.g., the example writing-surface view screen system 2000 or example whiteboard-type writing-surface view screen 2100) or the projected view screen systems discussed herein. For example, the window array 2010 could be replaced with a single panel blocking only polarization type A. The single polarization obstructing system may be used with cloaking and non-cloaking markers.

Various implementations may use the techniques and architectures described above.

A1 In an example, a system includes: a writing-surface view screen including: a backlight; a view screen polarizer layer oriented to polarize output of the backlight in view-screen-output polarization; and a front surface configured to accept cloaking markings; a view-screen-mountable waveplate oriented to convert the view-screen-output polarization to a specific polarization; and a polarizer window within a line-of-sight of the writing-surface view screen through the view-screen-mountable waveplate, where the polarizer window filters the specific polarization to obscure cloaking markings on the front surface.

A2 The system of example A1, where the view-screen-mountable waveplate is mounted on the writing-surface view screen to form the front surface.

A3 The system of either example A1 or A2, where the view-screen-mountable waveplate includes an adhesive layer.

A4 The system of any of examples A1-A3, where an outer surface of the view screen polarizer layer forms the front surface.

A5 The system of any of examples A1-A4, where: the front surface is further configured to accept a non-cloaking marking; and the non-cloaking marking is configured to generate light in another polarization different from the view-screen-output polarization responsive to the output of the backlight.

A6 The system of any of examples A1-A5, where the writing-surface view screen further includes a diffusive layer between the backlight and the view screen polarizer layer.

A7 The system of any of examples A1-A6, where the writing-surface view screen further includes an absorptive background behind the view screen polarizer layer, the absorptive background configured to cause the writing-surface view screen to appear black when: not backlit; or the output from the backlight is cloaked.

B1 In an example, a system includes: a polarization maintaining screen; a projector; a projector polarizer disposed between the projector and the polarization maintaining screen, the projector polarizer oriented to polarize output of the projector in a first polarization to generate an first polarization image on the polarization maintaining screen; a polarizer substrate configured to block a filtered polarization; an array including: a first panel set including waveplates oriented to convert a first polarization to the filtered polarization, the first panel set arranged within the array to obscure first polarization images; and a second panel set interspersed with the first panel set, the second panel set arranged within the array to obscure second polarization images.

B2 The system of example B1, where the first polarization includes a vertical polarization, a horizontal polarization, a 45 degree polarization, a 135 degree polarization, a circular polarization, or any combination thereof.

B3 The system of either example B1 or B2, where the first and second panel sets are interspersed in a checkered pattern, crossing line pattern, diagonal crossing line pattern, a fractal pattern, a multi-scale pattern, a repeated ring pattern, a constrained randomized pattern, a letter pattern, a repeated triangle pattern, an aperiodic tiling pattern, or any combination thereof.

B4 The system of any of examples B1-B3, where the array further includes a third set interspersed with the first and second panel sets, the third panel set including waveplates oriented to convert a third polarization to the filtered polarization, the third panel set arranged within the array to obscure third polarization images.

B5 The system of any of examples B1-B4, where projector polarizer is mounted such that it covers the polarization maintaining screen.

B6 The system of any of examples B1-B5, where projector polarizer is mounted to cover an output lens of the projector.

C1 In an example, a system includes: a writing-surface view screen including: a backlight; a polarizer layer oriented to polarize output of the backlight in a first polarization; and a front surface configured to receive a cloaking marking when engaged with a cloaking marker; first regions placed to render unintelligible the cloaking marking when displayed on the front surface, the first regions obstructive to the first polarization and transmissive to a second polarization different than the first polarization; and second regions interlaced with the first regions, the second regions placed to render unintelligible view screen output in the second polarization.

C2 The system of example C1, where the first and second regions are arranged in a checkered pattern, crossing line pattern, diagonal crossing line pattern, a fractal pattern, a multi-scale pattern, a repeated ring pattern, a constrained randomized pattern, a letter pattern, a repeated triangle pattern, an aperiodic tiling pattern, or any combination thereof.

C3 The system of either example C1 or C2, where the first and second regions overlap at least in part.

C4 The system of any of examples C1-C3, where the writing-surface view screen includes a whiteboard.

C5 The system of any of examples C1-C4, where the front surface is further configured to receive a non-cloaking marking when engaged with a non-cloaking marker.

C6 The system of example C5, where neither the first regions nor the second regions are placed to render unintelligible the non-cloaking marking when displayed on the front surface.

C7 The system of any of examples C1-C6, where an outer surface of the polarizer layer forms the front surface.

D1 In an example, a system includes: a writing-surface view screen including: a backlight; a polarizer layer oriented to polarize output of the backlight in a first polarization; and a front surface configured to: receive a cloaking marking when engaged with a cloaking marker; and receive a non-cloaking marking when engaged with a non-cloaking marker; a panel placed to render unintelligible the cloaking marking when displayed on the front surface but not render unintelligible the non-cloaking marking when displayed on the front surface, the panel obstructive to the first polarization and transmissive to a second polarization different than the first polarization.

E1 any component of any of the systems of examples A1-A7, B1-B6, C1-C7, or D1.

F1 In an example, a method includes the method implemented by operation of any of the systems or components thereof of any of examples A1-A7, B1-B6, C1-C7, or D1.

G1 In an example, a kit includes any of the components of any of the systems of any of examples A1-A7, B1-B6, C1-C7, D1, or any combination thereof.

Various implementations have been specifically described. However, many other implementations are also possible.

What is claimed is:

1. A method of manufacture including:
   designating a set of one or more cloaking markers;
   providing a writing-surface view screen including:
   a backlight;
   a view screen polarizer layer oriented to polarize output of the backlight in view-screen-output polarization; and
   a markable front surface formed by a view-screen-mountable waveplate oriented to convert the view-screen-output polarization to a specific polarization, where, when the writing-surface view screen is placed within a line-of-sight of a polarizer window through the view-screen-mountable waveplate, the polarizer window filters the specific polarization to obscure cloaking markings, from a cloaking marker in the set of one or more cloaking markers, on the markable front surface.

2. The method of manufacture of claim 1, where the view-screen- mountable waveplate includes an adhesive layer.

3. The method of manufacture of claim 1, where non-cloaking markings, when present on the markable front surface, light in another polarization different from the view-screen-output polarization responsive to the output of the backlight.

4. The method of manufacture of claim 1, where the writing-surface view screen further includes a diffusive layer between the backlight and the view screen polarizer layer.

5. The method of manufacture of claim 1, where the writing-surface view screen further includes an absorptive background behind the view screen polarizer layer, the absorptive background configured to cause the writing-surface view screen to appear black when:
   the backlight is off; or
   the output from the backlight is cloaked.

6. The method of manufacture of claim 1, where the set of one or more cloaking markers includes a non-fluorescing marker.

7. A system including:
   a writing-surface view screen; and
   a polarizer window,
   the writing-surface view screen including:
   a backlight;
   a view screen polarizer layer oriented to polarize output of the backlight in view- screen-output polarization; and
   a markable front surface formed by a view-screen-mountable waveplate oriented to convert the view-screen-output polarization to a specific polarization;
   a designation specifying a set of one or more cloaking markers; and
   the polarizer window configured to filter the specific polarization to obscure cloaking markings, from a cloaking marker in the set of one or more cloaking markers, on the markable front surface when within a line-of-sight of the markable front surface.

8. The system of claim 7, where the view-screen-mountable waveplate includes an adhesive layer.

9. The system of claim 7, where non-cloaking markings, when present on the markable front surface, light in another polarization different from the view-screen-output polarization responsive to the output of the backlight.

10. The system of claim 7, where the writing-surface view screen further includes a diffusive layer between the backlight and the view screen polarizer layer.

11. The system of claim 7, where the writing-surface view screen further includes an absorptive background behind the view screen polarizer layer, the absorptive background configured to cause the writing-surface view screen to appear black when:
the backlight is off; or
the output from the backlight is cloaked.

12. A system including:
a writing-surface view screen including:
a backlight;
a polarizer layer oriented to polarize output of the backlight in a first polarization; and
a markable front surface;
a designation specifying a set of one or more cloaking markers;
first regions placed to render unintelligible a cloaking marking, from a cloaking marker in the set of one or more cloaking markers, when displayed on the markable front surface, the first regions obstructive to the first polarization and transmissive to a second polarization different than the first polarization; and
second regions interlaced with the first regions, the second regions placed to render unintelligible view screen output in the second polarization.

13. The system of claim 12, where the first and second regions are arranged in a checkered pattern, crossing line pattern, diagonal crossing line pattern, a fractal pattern, a multi-scale pattern, a repeated ring pattern, a constrained randomized pattern, a letter pattern, a repeated triangle pattern, an aperiodic tiling pattern, or any combination thereof.

14. The system of claim 12, where the first and second regions overlap at least in part.

15. The system of claim 12, where the writing-surface view screen includes a whiteboard.

16. The system of claim 12, where the markable front surface is further configured to receive a non-cloaking marking when engaged with a non-cloaking marker.

17. The system of claim 16, where neither the first regions nor the second regions are placed to render unintelligible the non-cloaking marking when displayed on the markable front surface.

18. The system of claim 14, where an outer surface of the polarizer layer forms the markable front surface.

19. The system of claim 14, where the set of one or more cloaking markers includes non-fluorescing markers.

20. The system of claim 14, further including another designation specifying a set of non-cloaking markers.

* * * * *